(12) United States Patent
Yoshizawa et al.

(10) Patent No.: US 10,519,853 B2
(45) Date of Patent: Dec. 31, 2019

(54) DRIVING APPARATUS WITH SWINGING LINEAR MOTION MECHANISM

(71) Applicant: Z Mechanism Technology Institute Co., Ltd., Yonezawa-shi, Yamagata (JP)

(72) Inventors: Yutaka Yoshizawa, Yonezawa (JP); Jun Nango, Yonezawa (JP); Yasuo Yoshizawa, Yonezawa (JP); Takumi Yoshizawa, Yonezawa (JP); Satoshi Yoshizawa, Yonezawa (JP)

(73) Assignee: Z Mechanism Technology Institute Co., Ltd., Yonezawa-shi (JP)

( * ) Notice: Subject to any disclaimer, the term of this patent is extended or adjusted under 35 U.S.C. 154(b) by 0 days.

(21) Appl. No.: 16/297,407

(22) Filed: Mar. 8, 2019

(65) Prior Publication Data

US 2019/0203639 A1 Jul. 4, 2019

Related U.S. Application Data

(63) Continuation of application No. PCT/JP2016/089127, filed on Dec. 28, 2016.

(51) Int. Cl.
*F02B 75/32* (2006.01)
*F16H 21/22* (2006.01)
(Continued)

(52) U.S. Cl.
CPC ............... *F02B 75/32* (2013.01); *F01B 1/10* (2013.01); *F01B 9/04* (2013.01); *F02B 75/28* (2013.01);
(Continued)

(58) Field of Classification Search
CPC .. F02B 75/32; F02B 75/28; F01B 1/10; F01B 9/023; Y10T 74/18256
(Continued)

(56) References Cited

U.S. PATENT DOCUMENTS 4,270,395 A 6/1981 Grundy
4,485,768 A * 12/1984 Heniges ................. F01B 9/023
123/197.1
(Continued)

FOREIGN PATENT DOCUMENTS

JP S48-29913 A 4/1973
JP H7-305601 A 11/1995
(Continued)

OTHER PUBLICATIONS

International Search Report dated Apr. 18, 2017 in connection with PCT International Application No. PCT/JP2016/089127.

*Primary Examiner* — Long T Tran
*Assistant Examiner* — James J Kim
(74) *Attorney, Agent, or Firm* — John P. White; Cooper & Dunham LLP

(57) ABSTRACT

According to an embodiment, a driving apparatus includes a housing, a first driving body in the housing to be rotatable around a first central axis, an eccentric driving body provided in the first driving body to be rotatable around a second central axis parallel to the first central axis, a first pivot provided at one axial end of the eccentric driving body and eccentrically to the second central axis, a second pivot provided at another axial end of the eccentric driving body and eccentrically to the second central axis, a first moving body rotatably coupled to the first pivot and linearly movable along a third central axis, a first guide body which guides movement of the first moving body, and a second guide body which guides the second pivot to be movable in a first direction.

14 Claims, 19 Drawing Sheets

(51) Int. Cl.
  *F04B 9/04* (2006.01)
  *F16F 15/22* (2006.01)
  *F16C 3/30* (2006.01)
  *F02B 75/28* (2006.01)
  *F04B 37/12* (2006.01)
  *F04B 9/02* (2006.01)
  *F01B 1/10* (2006.01)
  *F01B 9/04* (2006.01)
  *F16H 21/18* (2006.01)

(52) U.S. Cl.
  CPC .............. *F02B 75/282* (2013.01); *F04B 9/02* (2013.01); *F04B 9/045* (2013.01); *F04B 37/12* (2013.01); *F16C 3/30* (2013.01); *F16F 15/22* (2013.01); *F16H 21/18* (2013.01); *F16H 21/22* (2013.01)

(58) Field of Classification Search
  USPC .............. 123/197.1, 197.4, 55.2, 55.7, 71 R; 74/49
  See application file for complete search history.

(56) References Cited

U.S. PATENT DOCUMENTS

| | | |
|---|---|---|
| 5,782,213 A | 7/1998 | Pedersen |
| 6,062,023 A | 5/2000 | Kerwin |
| 7,654,802 B2* | 2/2010 | Crawford, Jr. .......... F04B 23/06 417/273 |
| 2003/0037737 A1 | 2/2003 | Artola |
| 2006/0053964 A1* | 3/2006 | Venettozzi ............ F02B 75/048 74/595 |
| 2009/0272259 A1 | 11/2009 | Cook et al. |
| 2011/0146601 A1* | 6/2011 | Fisher .................... F01B 9/047 123/62 |

FOREIGN PATENT DOCUMENTS

| | | |
|---|---|---|
| JP | H9-119301 A | 5/1997 |
| JP | 2001-59475 A | 3/2001 |
| JP | 2001-510263 A | 7/2001 |
| JP | 2002-285972 A | 10/2002 |
| JP | 2006-513359 A | 4/2006 |
| JP | 2011-17329 A | 1/2011 |
| JP | 2014-111921 A | 6/2014 |
| JP | 2016-166598 A | 9/2016 |
| WO | WO 2008/010490 A1 | 1/2008 |

* cited by examiner

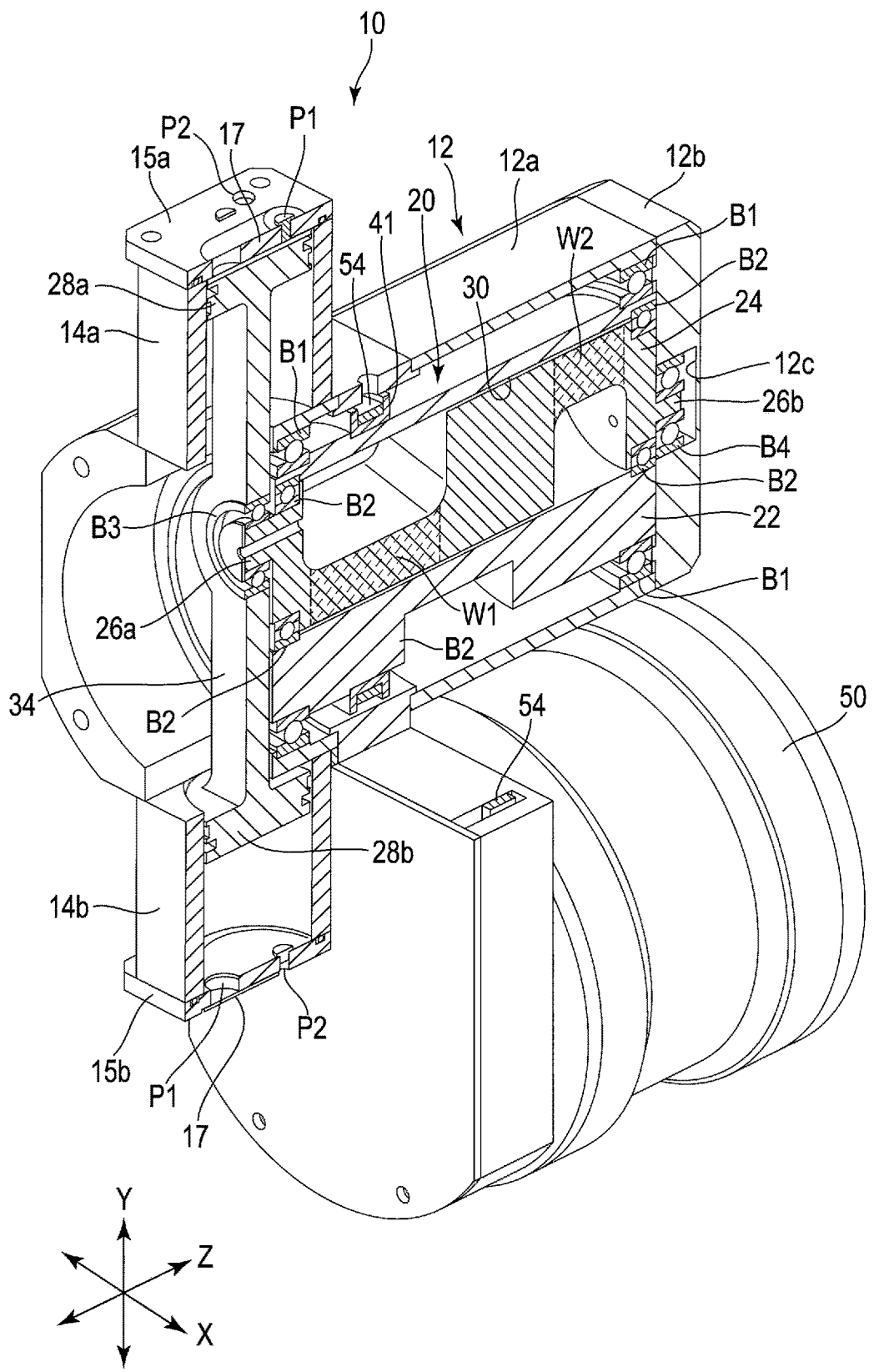
F I G. 2

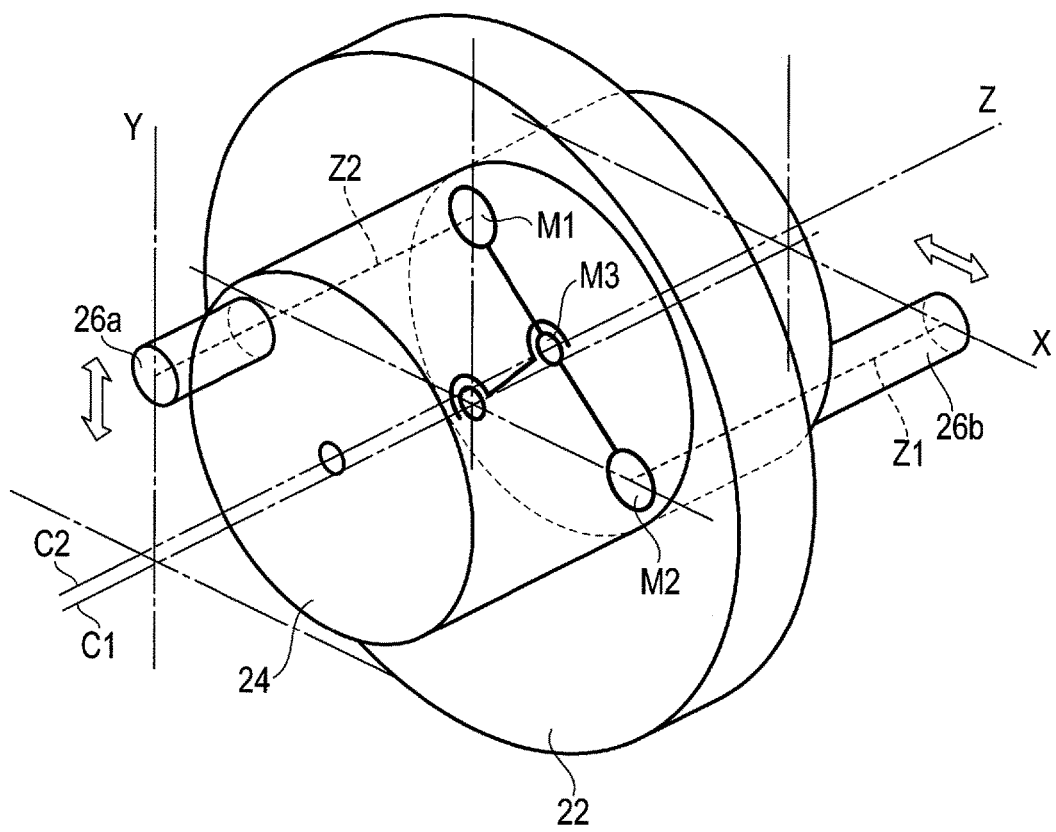
F I G. 6

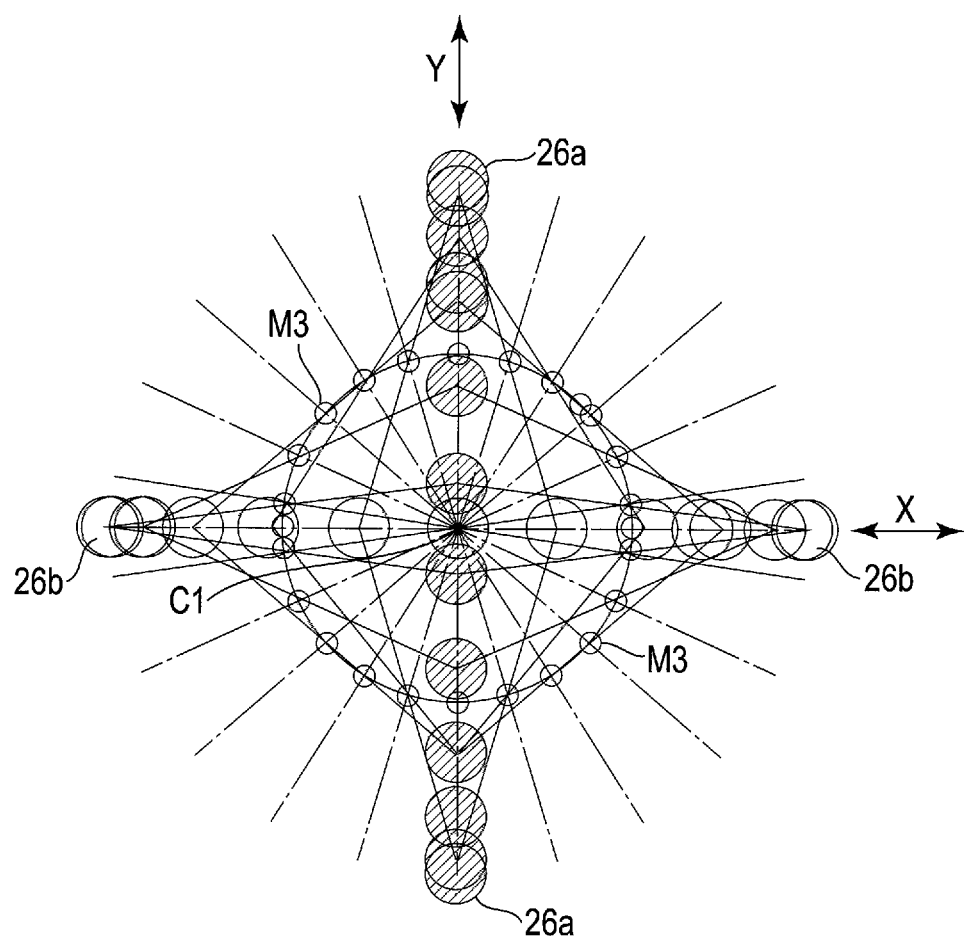
F I G. 7

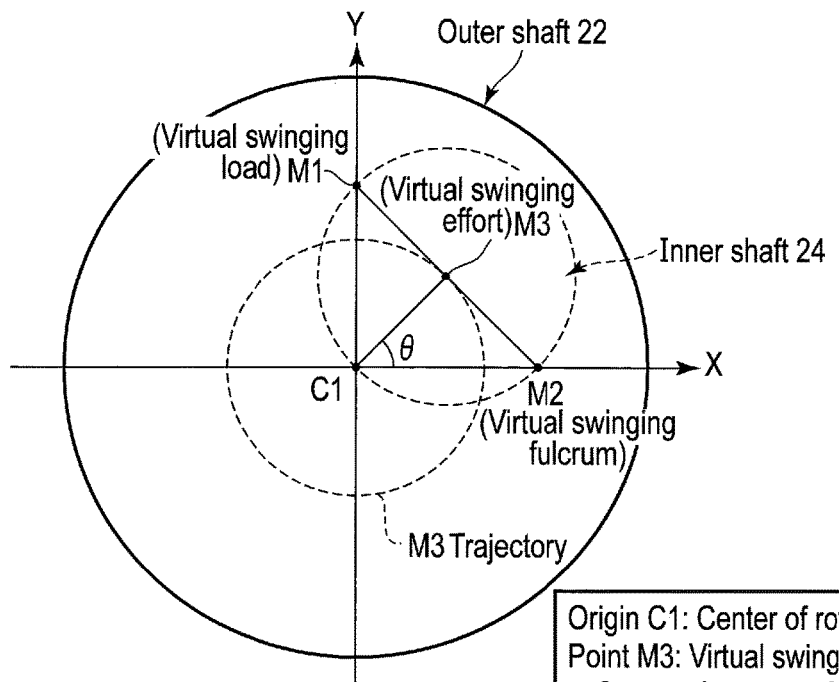
FIG. 8A
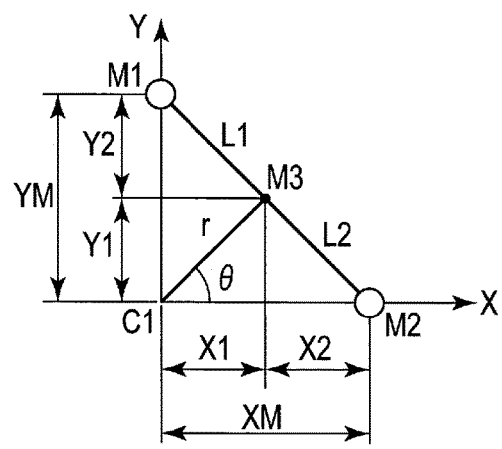
FIG. 8B   Points and segments on projection plane

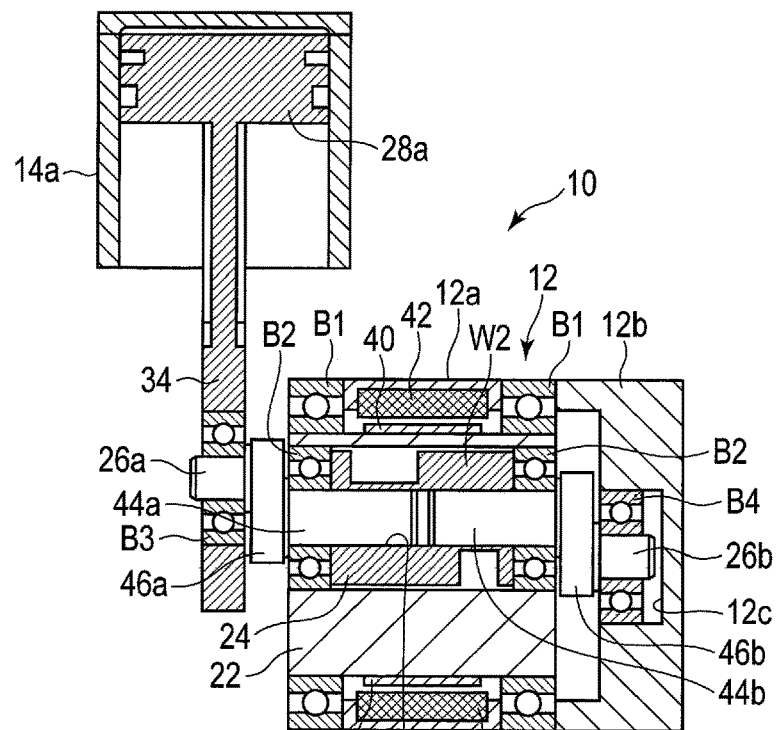
F I G. 12
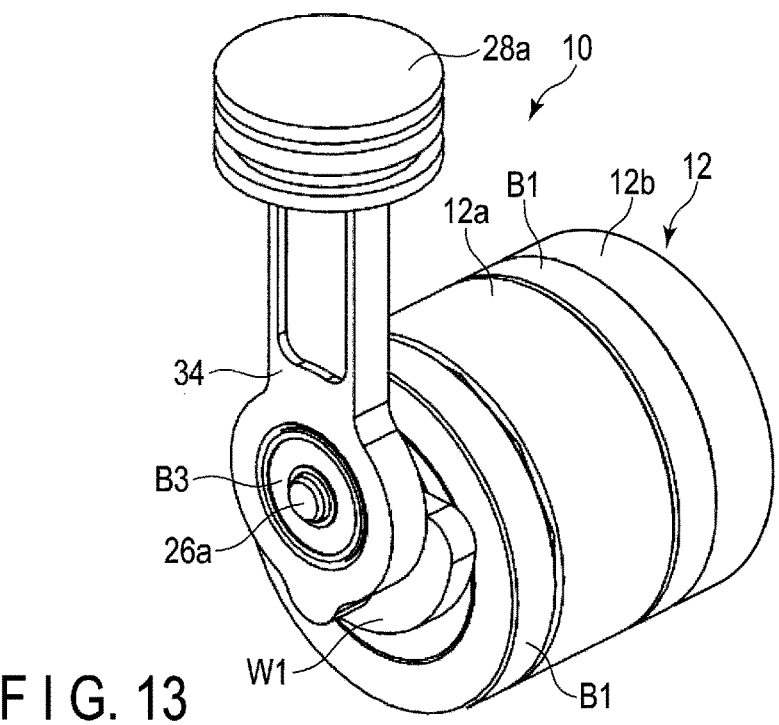
F I G. 13

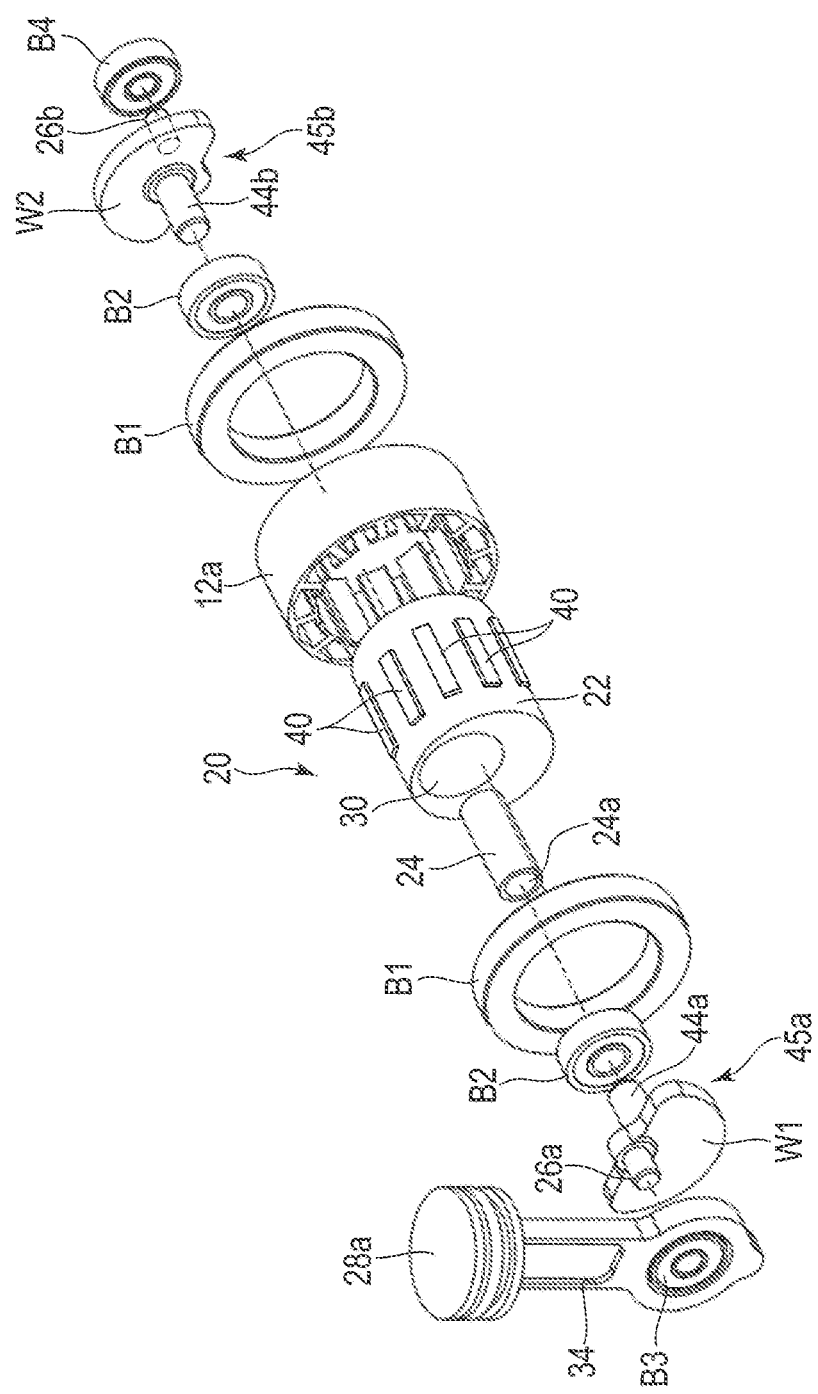
F I G. 14

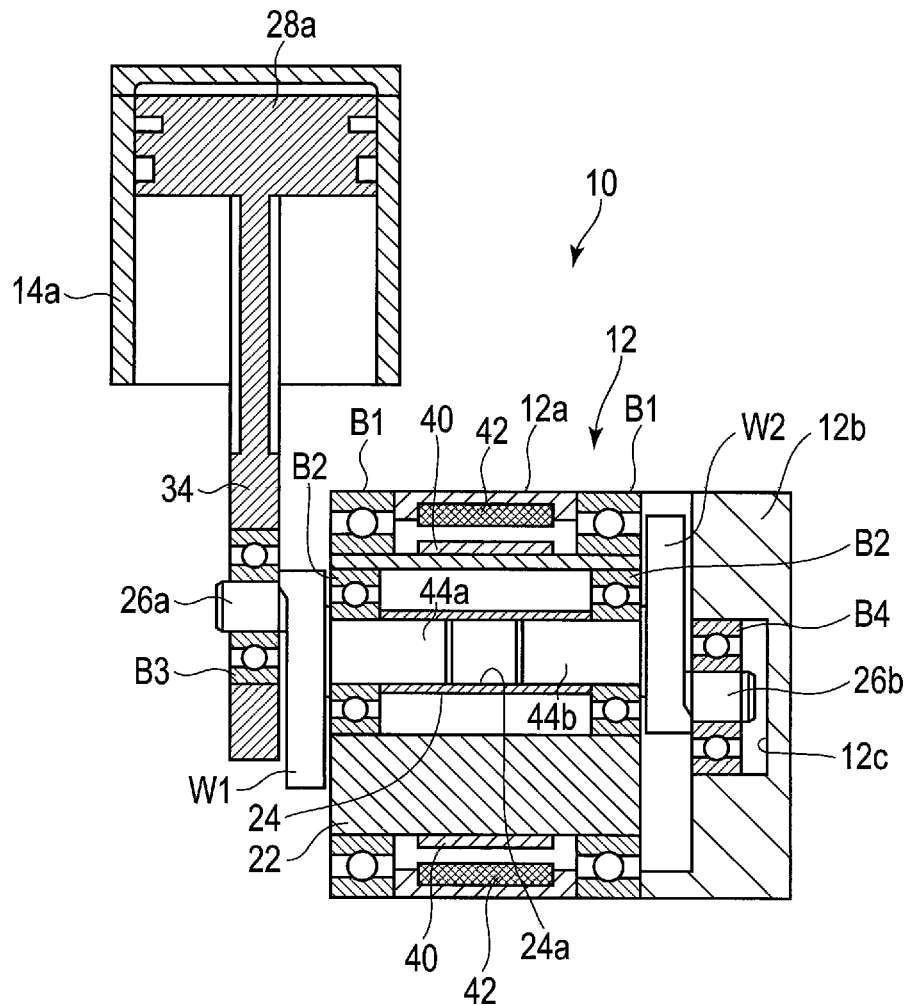
F I G. 15

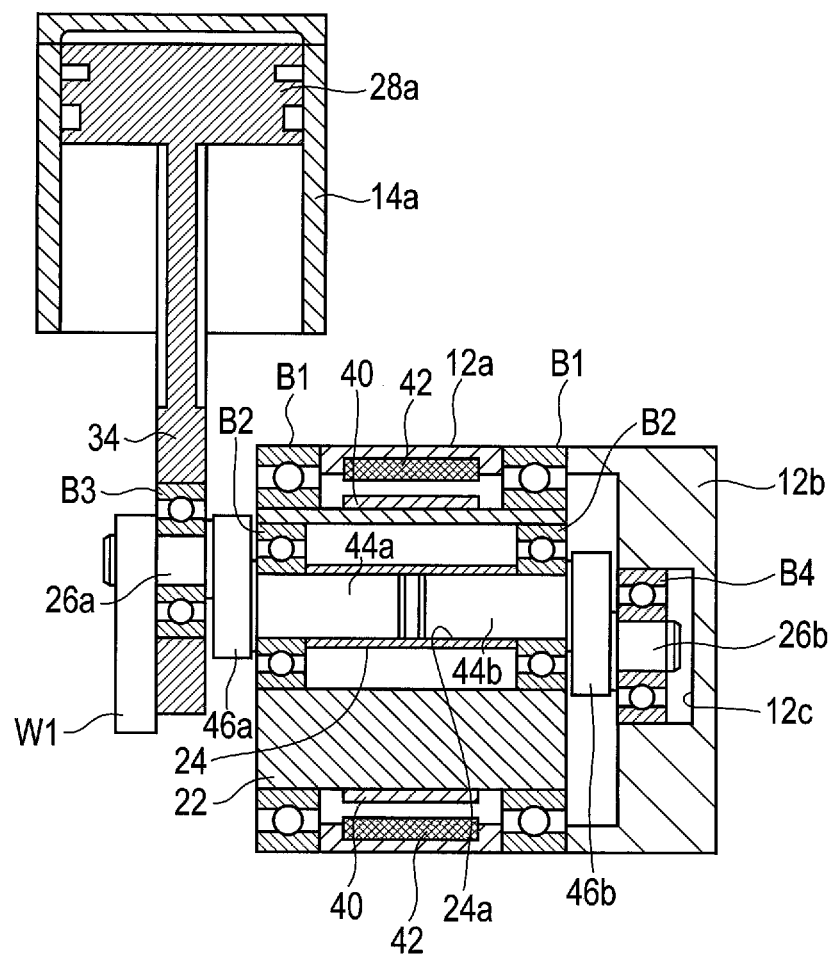
F I G. 16

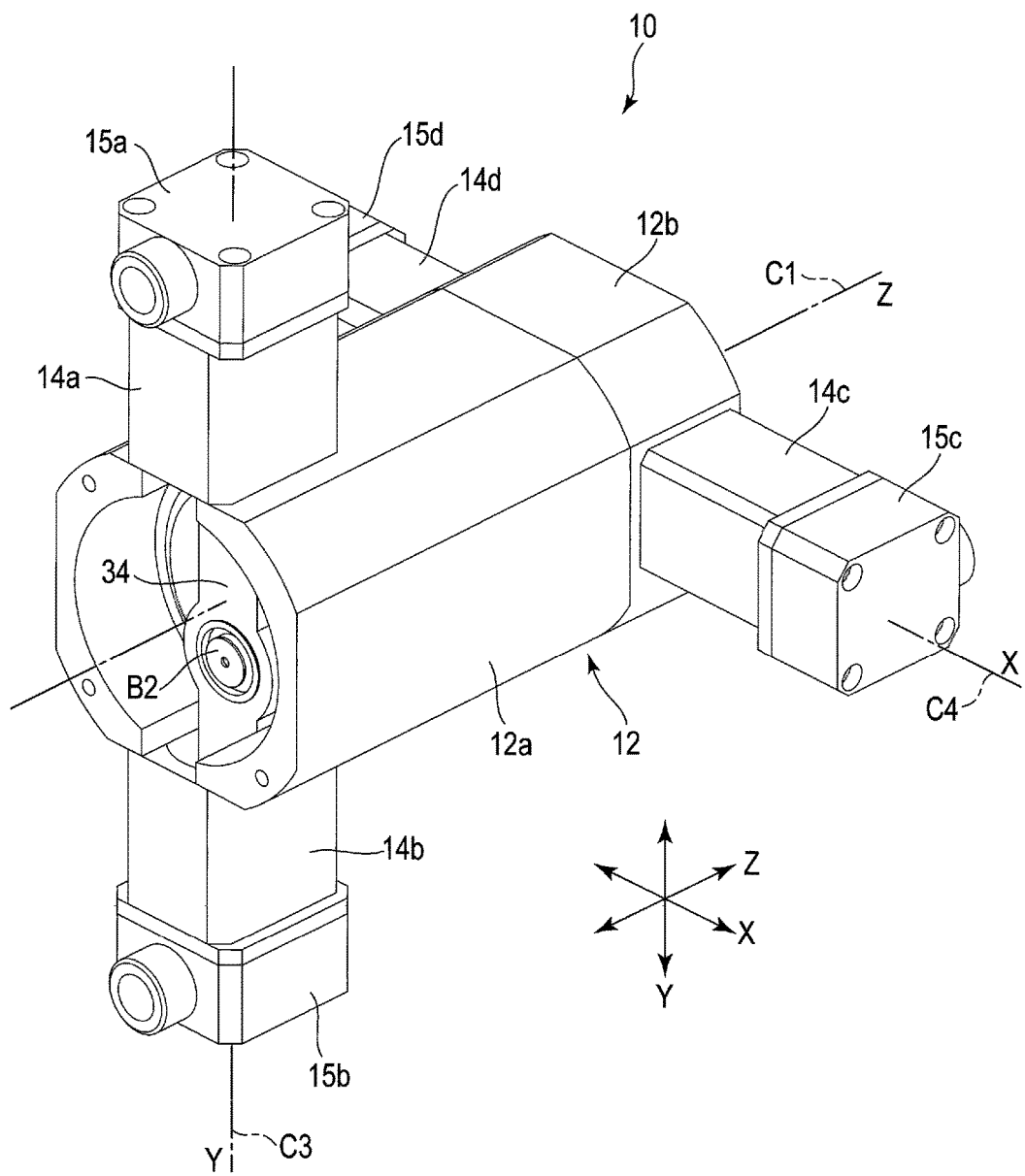
F I G. 17

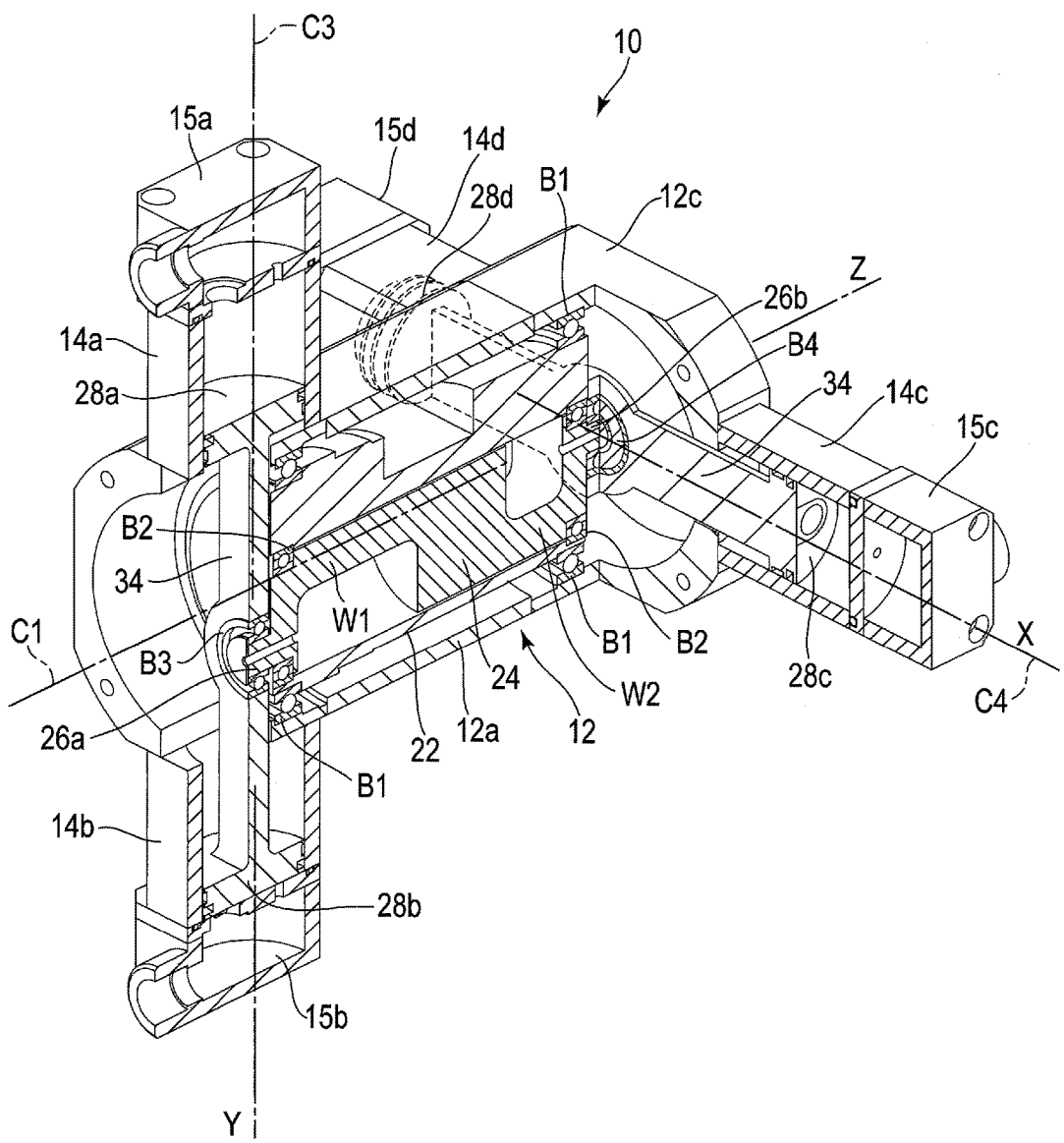
F I G. 18

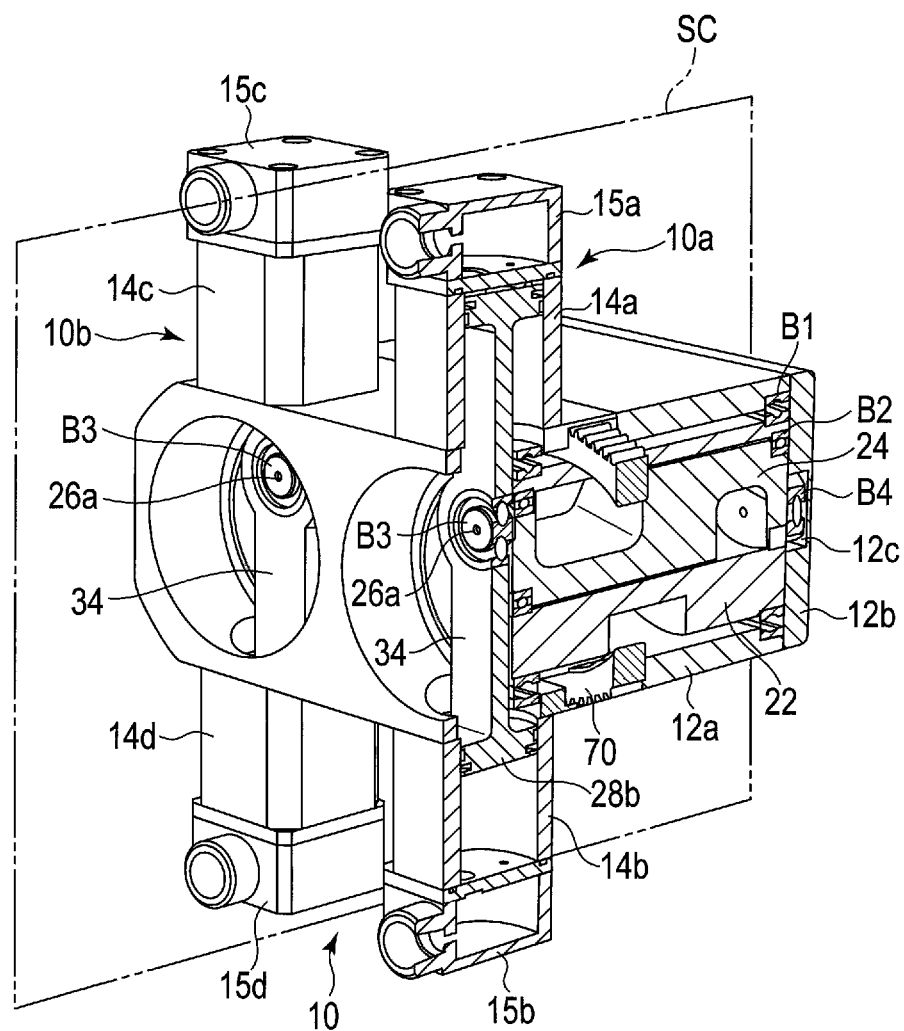
F I G. 20

DRIVING APPARATUS WITH SWINGING LINEAR MOTION MECHANISM

CROSS-REFERENCE TO RELATED APPLICATIONS

This application is a Continuation Application of PCT Application No. PCT/JP2016/089127, filed Dec. 28, 2016, the entire contents of which are incorporated herein by reference.

BACKGROUND OF THE INVENTION

1. Field of the Invention

The present invention relates to a driving apparatus provided with a swinging linear motion mechanism that converts rotating and swinging motion of a rotating body that rotates based on a dual eccentric arc into linear motion.

2. Description of the Related Art

A dual eccentric arc swinging mechanism is known as a mechanism to convert rotating motion into linear motion. In the dual eccentric arc swinging mechanism, one eccentric shaft makes linear motion by setting the radii of a dual circle of an eccentric mechanism at a specific ratio.

However, when the dual eccentric arc swinging mechanism is used as a driving mechanism, it becomes unstable because it is unknown in which direction a rotating body rotates at dead points (upper and lower dead points) of a moving body. This unstableness does not necessarily generate linear motion but may stop a moving body, which moves linearly, at its upper and lower dead points. A method of eliminating the unstableness has not yet been found.

BRIEF SUMMARY OF THE INVENTION

In general, according to one embodiment, a driving apparatus comprises a housing; a first driving body supported in the housing to be rotatable around a first central axis; an eccentric driving body provided in the first driving body to be rotatable around a second central axis parallel to the first central axis; a first pivot provided at one axial end of the eccentric driving body and eccentrically to the second central axis and extending parallel to the second central axis; a second pivot provided at another axial end of the eccentric driving body in the axis direction and eccentrically to the second central axis and extending parallel to the second central axis; a first moving body rotatably coupled to the first pivot and linearly moving along a third central axis orthogonal to the first central axis; a first guide body which guides movement of the first moving body along the third central axis; and a second guide body which guides the second pivot to be linearly movable in a first direction orthogonal to the first central axis.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a partially cutaway perspective view of the driving apparatus.

FIG. 6 is a schematic diagram showing a relationship in position between a central axis of an outer shaft and an inner shaft of the swinging linear motion mechanism.

FIG. 7 is a diagram showing trajectories of a swinging load, a swinging fulcrum and a virtual swinging effort of the swinging linear motion mechanism.

FIG. 8A is a diagram showing a relationship in position among a projection plane, the outer shaft and the inner shaft of the swinging linear motion mechanism.

FIG. 8B is a diagram showing virtual points and segments on the projection plane.

FIG. 12 is a sectional view of the driving apparatus according to the second embodiment.

FIG. 13 is a perspective view showing a driving apparatus according to a third embodiment.

FIG. 14 is an exploded perspective view of a swinging linear motion mechanism of the driving apparatus according to the third embodiment.

FIG. 15 is a sectional view of the driving apparatus according to the third embodiment.

FIG. 16 is a sectional view of the driving apparatus according to a fourth embodiment.

FIG. 17 is a perspective view showing a driving apparatus according to a fifth embodiment.

FIG. 18 is a partially cutaway perspective view of the driving apparatus according to the fifth embodiment.

FIG. 20 is a partially cutaway perspective view of the driving apparatus according to the sixth embodiment.

DETAILED DESCRIPTION OF THE INVENTION

Figure 1:
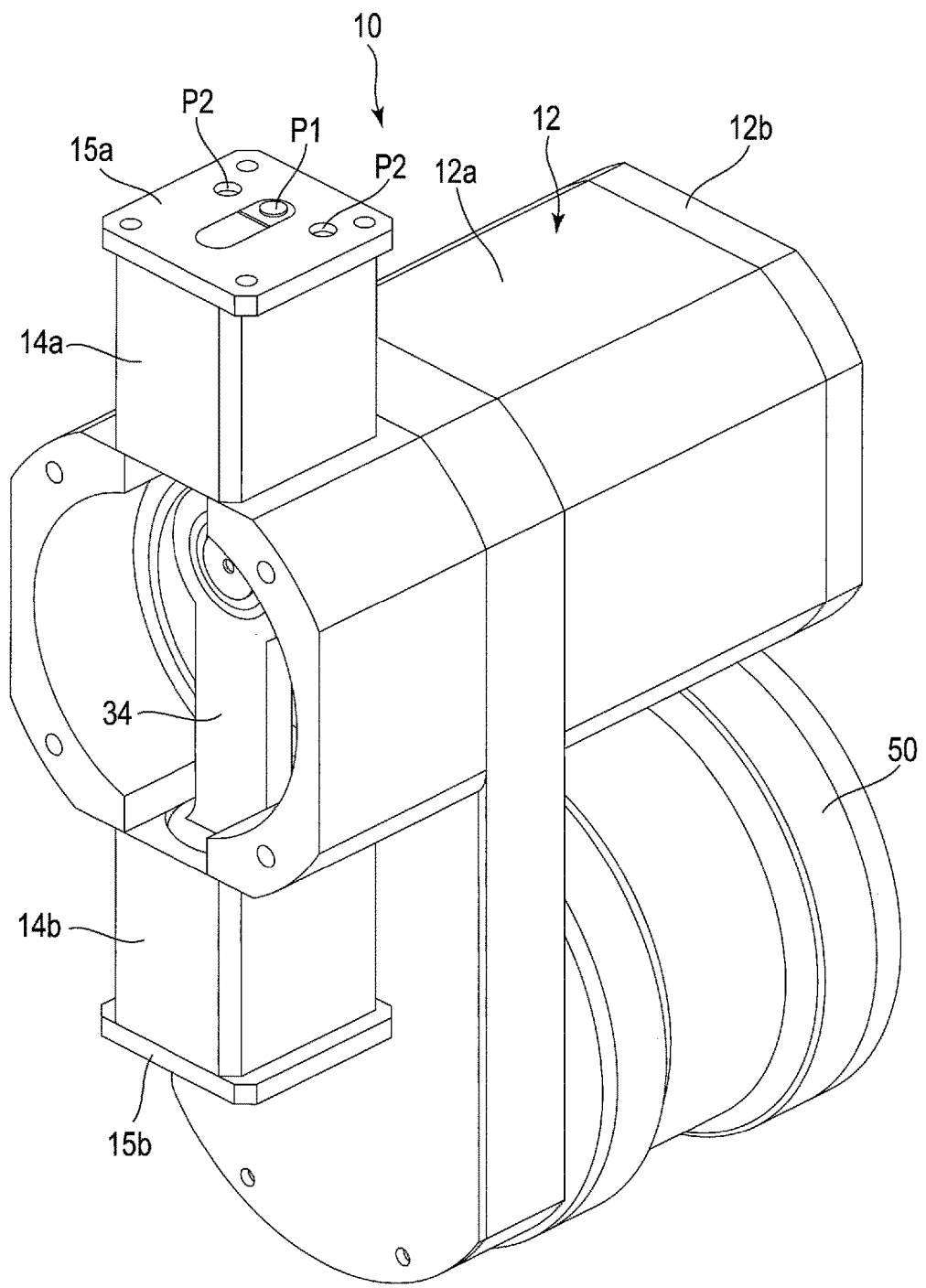
FIG. 1 is a perspective view showing a driving apparatus according to a first embodiment.

Various embodiments will be described hereinafter with reference to the accompanying drawings.

In embodiments, common structures are denoted by the same reference numbers and symbols, and overlapping explanations are omitted. The drawings are exemplary diagrams of the embodiments for promoting the understanding. The shape, dimension and ratio in the drawings may be different from those of the actual apparatus. They can be appropriately modified in consideration of the explanations below and the well-known art.

First Embodiment

Figure 3:
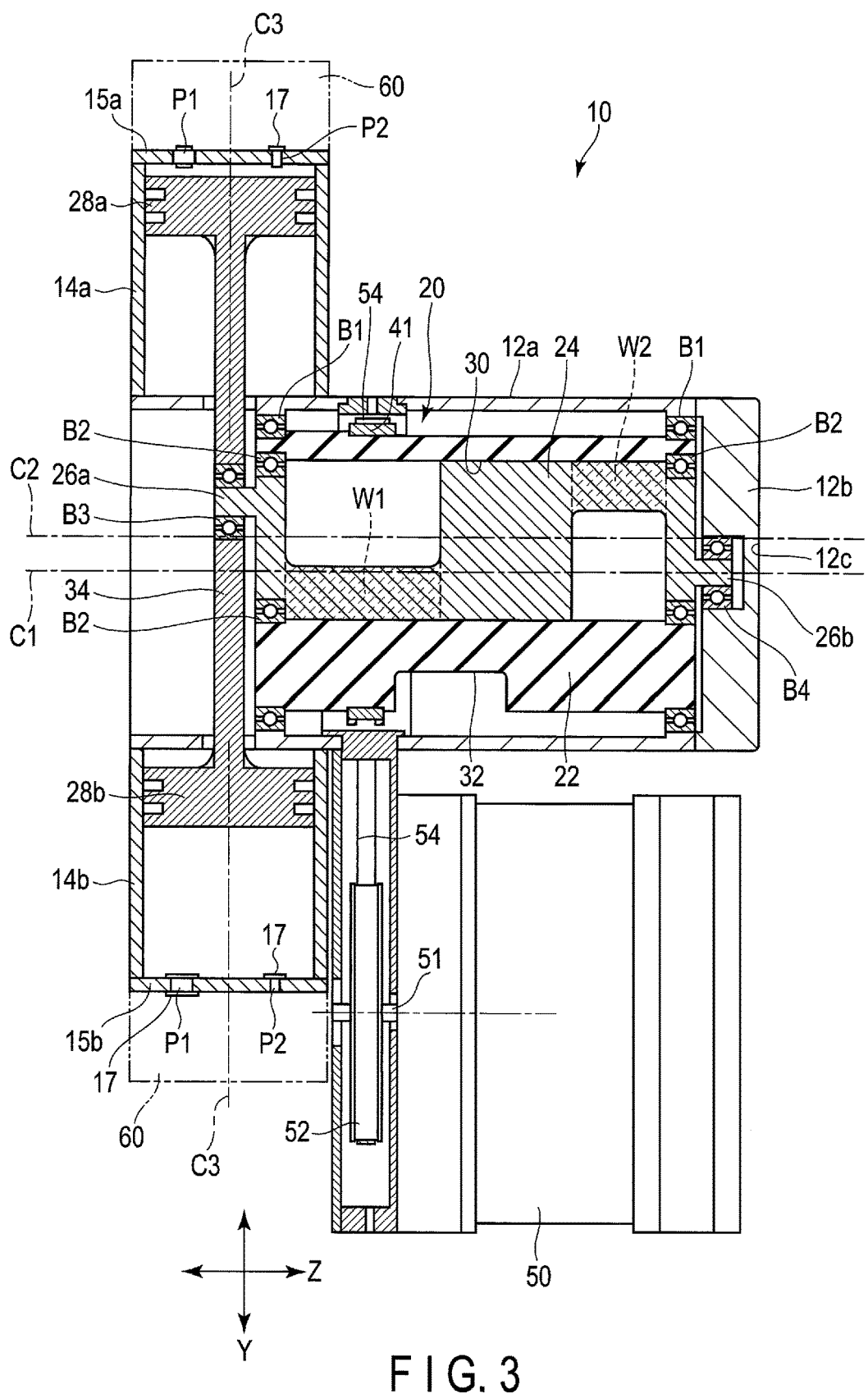
FIG. 3 is a sectional view of the driving apparatus.
Figure 4:
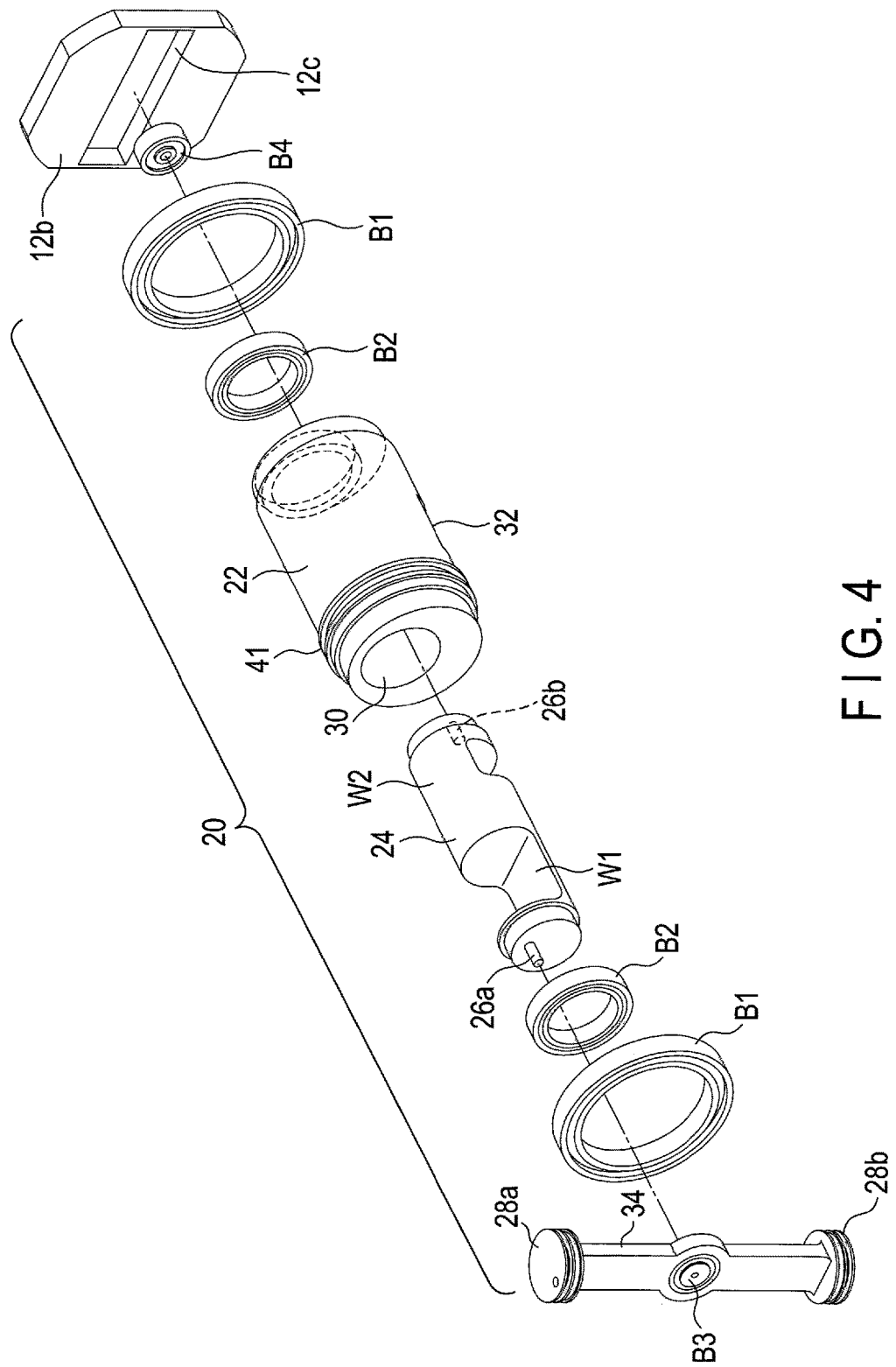
FIG. 4 is an exploded perspective view showing a swinging linear motion mechanism of the driving apparatus.

FIG. 1 is a perspective view of a driving apparatus according to a first embodiment, FIG. 2 is a partially cutaway perspective view of the driving apparatus, FIG. 3 is a sectional view of the driving apparatus, and FIG. 4 is an exploded perspective view of a dual eccentric swinging linear motion mechanism of the driving apparatus.

In the present embodiment, a driving apparatus 10 is configured as, for example, a compressor or a generator. As shown in FIGS. 1, 2 and 3, the driving apparatus 10 includes a housing (crank case) 12 shaped like an almost square tube, first and second cylinders 14a and 14b attached to the housing 12, a dual eccentric swinging linear motion mechanism (referred to as a swinging linear motion mechanism hereinafter) 20 provided in the housing 12 and the first and second cylinders 14a and 14b, and a motor 50 for rotating an outer shaft (first driving body) 22 of the swinging linear motion mechanism 20.

The housing 12 includes a square-tube-like main body 12a and a plate-like end plate 12b that closes the opening of one end of the main body 12a. The inner surface of the body 12a is formed like a cylinder. A linear guide groove 12c is formed in the end plate 12b, to guide the linear motion of a swinging fulcrum to be described later. The first and second cylinders 14a and 14b are provided at the other end of the housing 12 and on both sides of a central axis C1 of the housing 12. The first and second cylinders 14a and 14b are arranged coaxially with each other, and the central axis C3 of the cylinders 14a and 14b is disposed so as to be orthogonal to the central axis C1 of the housing 12. Cylinder heads 15a and 15b, which close the openings of the upper ends of the first and second cylinders 14a and 14b, are each provided with an outlet port P1, an inlet port P2 and a lead valve 17 for opening and closing these ports. Note that first and second pistons 28a and 28b can be provided with an inlet port or the like.

FIG. 4 is an exploded perspective view of the swinging linear motion mechanism 20. As shown in FIGS. 2 to 4, the swinging linear motion mechanism 20 includes an almost columnar-shaped outer shaft (first driving body) 22, an inner shaft (eccentric driving body) 24 provided eccentrically in the outer shaft 22, a first support pin (first pivot) 26a and a second support pin (second pivot) 26b which are provided at both ends of the inner shaft 24 in its axial direction, and first and second pistons 28a and 28b coupled to the first support pin 26a as moving bodies.

The outer shaft 22 is disposed in the main body 12a of the housing 12 coaxially with the main body 12a. Both end portions of the outer shaft 22 in its axial direction are supported rotatably with respect to the housing 12 by a first bearing (e.g., a ball bearing) B1. That is, the inner ring of the first bearing B1 is fitted to the outer periphery of the outer shaft 22 and the outer ring thereof is fitted to the inner surface of the housing 12. Thus, the central axis C1 of the outer shaft 22 is located coaxially with the central axis of the housing 12, and the outer shaft 22 is supported rotatably around the central axis C1.

In the present embodiment, an annular driven pulley 41 is fixed on the outer surface of the outer shaft 22 and provided coaxially with the outer shaft 22. The driven pulley 41 may be formed integrally with the outer shaft 22 or another pulley may be fixed to the outer shaft 22.

A circular through hole 30 is formed in the outer shaft 22. The through hole 30 has a central axis that is parallel to the central axis C1 of the outer shaft 22 and extends from one end of the outer shaft 22 to the other end thereof in its axial direction. The through hole 30 is also formed in a position eccentric to the central axis C1 of the outer shaft 22. For the purpose of keeping a rotation balance of the outer shaft 22, a notch 32 may be provided in part of the outer surface of the outer shaft 22. Here, the notch 32 is provided on the opposite side of the through hole 30 with respect to the central axis C1 of the outer shaft 22.

The inner shaft 24 is almost shaped like a column and its outer diameter is slightly smaller than the inner diameter of the through hole 30. The inner shaft 24 is formed to substantially equal to the outer shaft 22 in its axial direction. The inner shaft 24 is inserted into the through hole 30. Both end portions of the inner shaft 24 in its axial direction are each rotatably supported with respect to the inner surface of the through hole 30, i.e., with respect to the outer shaft 22 by a second bearing (e.g., a ball bearing) B2. The inner ring of the second bearing B2 is fitted to the outer surface of the inner shaft 24 and the outer ring thereof is fitted to the inner surface of the through hole 30. Thus, the central axis C2 of the inner shaft 24 is located coaxially with the central axis of the through hole 30 and supported rotatably around the central axis C2. The central axis C2 of the inner shaft 24 is parallel to the central axis C1 of the outer shaft 22 and is eccentric to the central axis C1.

The face of one end of the inner shaft 24 in its axial direction is substantially flush with that of one end of the outer shaft 22. Similarly, the face of the other end of the inner shaft 24 is substantially flush with that of the other end of the outer shaft 22. A column-shaped first support pin 26a protrudes from the face of one end of the inner shaft 24 and a column-shaped second support pin 26b protrudes from the face of the other end of the outer shaft 22. The first and second support pins 26a and 26b extend parallel to the central axis of the inner shaft 24. The first and second support pins 26a and 26b are also provided at a position eccentric to the central axis of the inner shaft 24. For example, the first and second support pins 26a and 26b are provided 180 degrees away from each other around the central axis of the inner shaft 24. The first support pin 26a functions as a swinging load to be described later and the second support pin 26b functions as a swinging fulcrum to be described later. Note that the first and second support pins 26a and 26b may be formed integrally with the inner shaft 24 or another support pint may rotatably be attached to the inner shaft 24.

In the present embodiment, the inner shaft 24 has a counterweight that is formed by the inner shaft 24 itself. That is, part of one end of the inner shaft 24 is cut into an almost U-shaped portion and the other part thereof constitutes a first counterweight portion W1. The first counterweight portion W1 is provided across the central axis C2 of the inner shaft 24 from the first support pin 26a. Part of the other end of the inner shaft 24 is also cut into an almost U-shaped portion and the other part thereof constitutes a second counterweight portion W2. The second counterweight portion W2 is provided across the central axis C2 of the inner shaft 24 from the second support pin 26b.

The swinging linear motion mechanism 20 includes first and second pistons 28a and 28b as moving bodies that move linearly. The first piston 28a is disposed in the first cylinder 14a. The first piston 28a is freely guide by the first cylinder 14a as a guide body to move up and down along the central axis C3 of the first cylinder 14a. The second piston 28b is disposed in the second cylinder 14b. The second piston 28b is freely guided by the second cylinder 14b as a guide body to move up and down along the central axis C3 of the second cylinder 14b. The first and second piston 28a and 28b are coupled to each other via a piston rod 34. The piston rod 34 extends coaxially with the central axis C3 of the first and second cylinders 14a and 14b.

The central portion of the piston rod 34 in its axial direction is rotatably coupled to the first support pin 16a via a third bearing (e.g., a ball bearing, a cam follower and a slider) B3. A fourth bearing (e.g., a ball bearing and a slider) B4 is fitted to the second support pin 26b of the inner shaft 24. The fourth bearing B4 is engaged in the guide groove 12c formed on the end plate 12b. Thus, the second support pin 26b and the fourth bearing B4 are guided by the guide groove 12c of the end plate 12b as a guide body such that it can freely move linearly along the axial direction (X-axis direction) of the guide groove 12c. Note that the extending direction of the central axis C1 of the outer shaft 22 is a Z-axis direction, a direction orthogonal to the Z-axis direction is a Y-axis direction, and a direction orthogonal to the Z-axis and Y-axis directions is an X-axis direction. The central axis C2 of the first and second cylinders 14a and 14b extends in the Y-axis direction and the central axis of the guide groove 12c extends in the X-axis direction.

As shown in FIGS. 2 and 3, the motor 50 is provided adjacent to the housing 12. The rotating shaft 51 of the motor 50 extends parallel to the central axis C1 of the outer shaft 22. A driving pulley 52 is attached to the rotating shaft 51. A driving belt 54 is put on the driving pulley 52 and the driven pulley 41 of the outer shaft 22. The motor 50 can rotate the outer shaft 22 around the central axis C1 via the driving pulley 52, driving belt 54 and driven pulley 41. Note that the transmission of driving force is not limited to a combination of the pulleys and the driving belt, but the driving force can be transmitted using a plurality of gears.

According to the driving apparatus 10 configured as described above, the motor 50 is driven to rotate the outer shaft 22 around the central axis C1. The inner shaft 24 rotates around the central axis C1 together with the outer shaft 22 and rotates on its central axis C2 with respect to the outer shaft 22. In this case, the rotation directions of the outer shaft 22 and the inner shaft 24 are opposite to each other. Thus, the first support pin 26a of the inner shaft 24 moves linearly along the Y-axis direction. The piston rod 34 coupled to the first support pin 26a via the third bearing B3 and the first and second pistons 28a and 28b reciprocate in the Y-axis direction in conjunction with the linear motion of the first support pin 26a. The first and second pistons 28a and 28b move up and down in the first and second cylinders 14a and 14b, respectively to compress and pressurize gas in the cylinders.

On the other hand, the second support pin 26b of the inner shaft 24 is guided to the guide groove 12c of the end plate 12b via the fourth bearing B4 to reciprocate linearly along the X-axis direction. The driving apparatus 10 with the forgoing configuration can function as a compressor by discharging gas compressed in the first and second cylinders 14a and 14b from the outlet port P1.

The principle of operation of the driving apparatus 10 will be described below.

Figure 5:
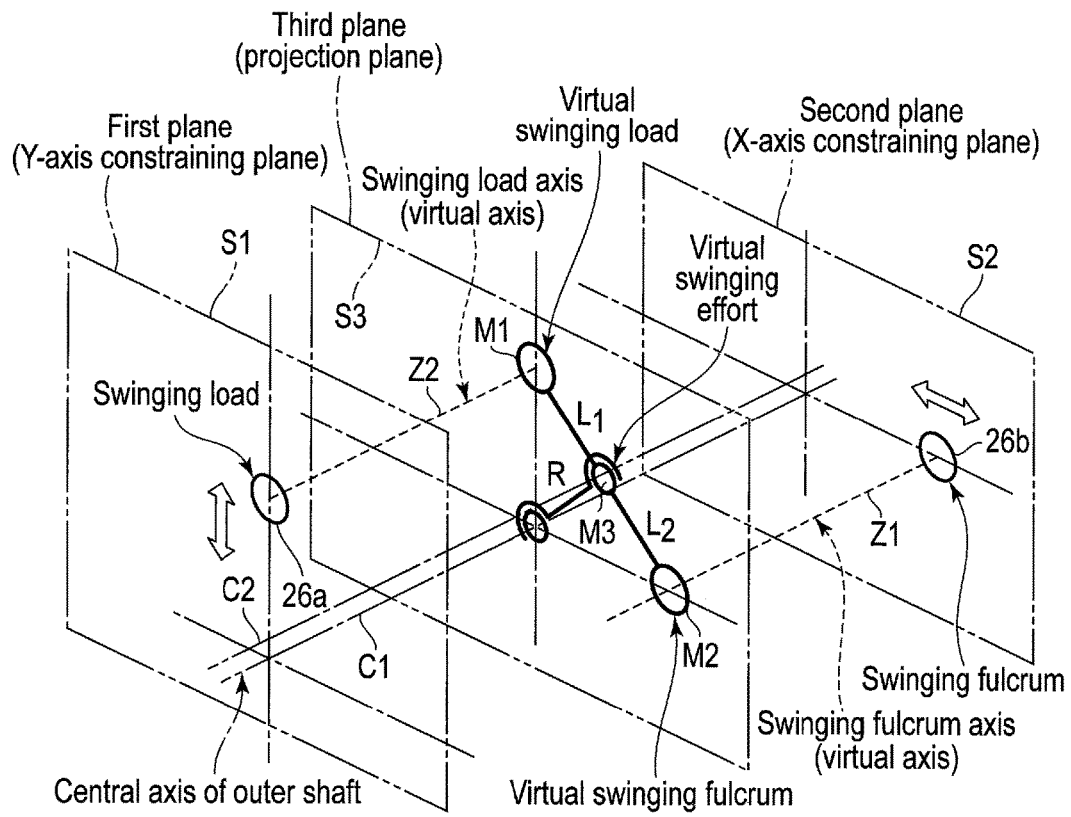
FIG. 5 is a conceptual diagram showing a plane and a configuration point by which the swinging linear motion mechanism is configured.
Figure 5:
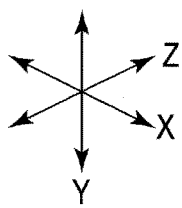

FIG. 5 is a schematic diagram showing a plane and a configuration point by which the dual eccentric swinging linear motion mechanism 20 is configured. FIG. 6 is a schematic diagram showing a relationship in position among the central axis C1 of the outer shaft (first driving body), a rotating central axis thereof, and the inner shaft (eccentric driving body). FIG. 7 is a diagram showing trajectories of a swinging load, a swinging fulcrum and a virtual swinging effort.

It is assumed in FIG. 5 that a first plane (Y-axis constraining plane) S1 and a second plane (X-axis constraining plane) S2 are parallel to each other and a virtual third plane S3 is located between the first and second planes and parallel to these planes. The central axis C1 of the outer shaft (first driving body) 22 and the central axis C2 of the inner shaft 24 are orthogonal to the first to third planes S1, S2 and S3. As shown in this conceptual diagram, a new mechanism is configured by providing a new reference plane in the parallel planes and virtually defining an extending axis.

As shown in FIGS. 5 and 6, the inner shaft 24 that is rotatably supported by the outer shaft 22 has the central axis C2 eccentric to the central axis C1 of the outer shaft 22. Also, the inner shaft 24 is a rotating body including the first support pin 26a as a swinging load and a second support pin 26b as a swinging fulcrum on the outer surface side. The swinging load 26a and swinging fulcrum 26b are constrained in their respective Y-axis and X-axis directions and move linearly.

The first support pin (swinging load) 26a which moves linearly in the Y-axis direction is present on the first plane (Y-axis constraining plane) S1. The second support pin (swinging fulcrum) 26b which moves linearly in the X-axis direction is present on the second plane (X-axis constraining plane) S2. The third plane S3 is a virtual projection plane including a virtual swinging load M1 and a virtual swinging fulcrum M2 on which the swinging load 26a and the swinging fulcrum 26b are respectively projected and a virtual swinging effort M3 at which a straight line connecting the virtual swinging load M1 and virtual swinging fulcrum M2 intersects the central axis C2 of the inner shaft (eccentric driving body) 24. The virtual swinging effort M3 is regarded as being connected to the rotation axis C1 of the outer shaft 22 by the straight line.

As shown in FIGS. 5 to 7, when force is applied to the virtual swinging effort M3 from the central axis C1 of the outer shaft 22 by the rotation of the outer shaft 22, the virtual swinging effort M3 rotates around the central axis C1. The force is thus transmitted to the swinging fulcrum 26b from the virtual swinging fulcrum M2 through a swinging fulcrum axis (virtual axis) Z1 to move the swinging fulcrum 26b in the X-axis direction. The force is also transmitted to the swinging load 26a from the virtual swinging load M1 through a swinging load axis (virtual axis) Z2. Accordingly, the swinging load 26a moves vertically in the Y-axis direction to vertically move the moving bodies of the piston rod 34 and first and second pistons 28a and 28b which are pivotally supported by the swinging load 26a.

In FIG. 7, the Y-axis direction is a trajectory of linear motion of the swinging load 26a and the first and second pistons 28a and 28b, and the X-axis direction is a trajectory of linear motion of the swinging fulcrum 26b. The trajectory of a small circle with the central axis C1 corresponds to that of the virtual swinging effort M3 of the inner shaft 24. It is a virtual lever that connects the swinging load 26a, swinging fulcrum 26b and the virtual swinging effort M3 and, in fact, it is included in the inner shaft 24 rotatably inserted into the outer shaft 22. Each of the swinging points is separated in the Y-axis and X-axis directions and makes a swinging motion.

If the swinging fulcrum 26b and the virtual swinging fulcrum axis Z1 are removed, they appear to rotate and reciprocate; however, a problem of dead points will occur to bring them into an unstable state in which they move or do not move and they do not rotate in a fixed direction. In contrast, according to the swinging linear motion mechanism 20 with the above configuration, when the outer shaft 22 rotates to apply force to the virtual swinging effort, the swinging fulcrum 26b overcomes a dead point and swings in the X-axis direction because its motion is constrained in the x-axis direction. It is therefore possible to allow the outer shaft 22 and the inner shaft 24 to rotate in a fixed direction. Inserting the virtual swinging load axis Z2 and the virtual swinging fulcrum axis Z1 to which the swinging load 26a and the swinging fulcrum 26b extend respectively, the problem of dead points can be resolved, a one-direction rotation can be transmitted with reliability, and a great force can be transmitted. At the same time, interconversion between the rotation motion of the outer shaft 22 and the inner shaft 24 and the linear reciprocating motion of the first and second support pins 26a and 26b can be performed with steadiness.

FIG. 8A is a schematic diagram showing a relationship in position between the outer and inner shafts on the projection plane S3. FIG. 8B is a diagram showing a relationship between points and segments on the projection plane S3.

In order to obtain a displacement of each of the virtual swinging load M1 and the virtual swinging fulcrum M2, which are virtual points projected on the projection plane S3 when they move linearly in their respective Y-axis and Y-axis directions, the relationship among the origin C1, virtual swinging load M1, virtual swinging fulcrum M2 and virtual swinging effort M3 is defined as follows. The segments connecting these points are determined as follows.

Segment C1M3=r, Segment C1M1=YM, Segment C1M2=XM, Segment M1M3=L1, Segment M3M2=L2

There is the following relationship among L1, L2 and r.

$$L1=L2=r \quad (1)$$

If a displacement of each of the virtual swinging load M1 and the virtual swinging fulcrum M2 is obtained under the foregoing conditions, it is expressed as follows.

The displacement YM of the virtual swinging load M1 is represented by the following equation using Y1 and Y2 in relation to the virtual swinging effort M3.

$$YM=Y1+Y2 \quad (2)$$

$$Y1=r \cdot \cos \theta \quad (3)$$

$$Y2=L1 \cdot \cos \theta \quad (4)$$

From the equations (2) to (4), the displacement YM of the virtual swinging load M1 is given by the following equation.

$$YM=r \cdot \cos \theta + L1 \cdot \cos \theta \quad (5)$$

Since, furthermore, r=L1, the displacement YM is determined as follows by the equations (1) and (5).

$$YM=2 \cdot r \cdot \cos \theta \quad (6)$$

Similarly, the displacement XM of the virtual swinging fulcrum M2 is represented by the following equation using X1 and X2 in relation to the virtual swinging effort M3.

$$XM=X1+X2 \quad (7)$$

$$X1=r \cdot \sin \theta \quad (8)$$

$$X2=L2 \cdot \sin \theta \quad (9)$$

From the equations (7) to (9), the displacement YM of the virtual swinging fulcrum M2 is given by the following equation.

$$XM=r \cdot \sin \theta + L2 \cdot \sin \theta \quad (10)$$

Since, furthermore, r=L2, the displacement XM is determined as follows by the equations (1) and (10).

$$XM=2 \cdot r \cdot \sin \theta \quad (11)$$

As shown in FIG. 6, the virtual points M1 and M2 are present on their respective virtual axes Z2 and Z1. The virtual axes Z2 and Z1 are present on a normal in the Z-axis direction of the swinging load 26a and swinging fulcrum 26b. Therefore, the actual displacements of the swinging load 26a and the swinging fulcrum 26b are equal to the displacement YM of the virtual swinging load M1 and the displacement XM of the virtual swinging fulcrum M2.

According to the driving apparatus 10 according to the first embodiment configured as described above, the dual eccentric swinging linear motion mechanism 20 is provided with the swinging fulcrum 26b and the guide body which guides the swinging fulcrum 26b to be linearly movable. Thus, the driving body can overcome a dead point and rotate in one direction with reliability, and the swinging load 26a can move linearly with reliability. That is, the outer shaft 22 and the inner shaft 24 can rotate in one direction with reliability, and the first and second support pins 26a and 26b can move linearly in their respective Y-axis and X-axis directions.

As in the present embodiment, the outer shaft 22 is rotated by the motor 50 and thus gas in the first and second cylinders 14a and 14b is compressed by the first and second pistons 28a and 28b, with the result that the driving apparatus can serve as a compressor. If the upper and lower first and second pistons 28a and 28b having different diameters are configured as a two-stage compression mechanism, a CO2 refrigerant refrigerating machine using, e.g., a motor capable of compressing a refrigerant at high pressure (e.g., close to 12 MPa) as the motor 50.

Alternatively, each of the cylinder heads is provided with a combustion mechanism 60 including a valve mechanism, a fuel supply means and an ignition means, as shown in FIG. 3. It is thus possible to supply fuel into the first and second cylinders 14a and 14b and ignite the fuel, and also drive the first and second pistons 28a and 28b in the Y-axis direction. The driving apparatus 10 can thus function as an engine. In this case, the motor 50 can be used as a starter. Alternatively, the inner and outer shafts 24 and 22 are rotated by the first and second pistons 28a and 28b and further, the motor 50 is driven by the outer shaft 22, with the result that the motor 50 can function as a generator.

According to the present embodiment, the vibration of the swinging linear motion mechanism 20 can be canceled by providing the inner shaft 24 with the counterweight portions W1 and W2. Furthermore, the overall apparatus can be compacted by configuring the counterweights by the inner shaft 24 itself. The position to keep a balance is not limited to the embodiment but can be set optionally in accordance with the capacity of the motor 50, the diameter of the pistons, a method of attaching the counterweights, and the like. The driving apparatus is thus excellent in convenience. The outer shaft 22, inner shaft 24 and first and second support pins 26a and 26b of the swinging linear motion mechanism 20 can axially be supported by bearings or the like, which makes it possible to operate the driving apparatus for a long time.

In the first embodiment, the driving apparatus 10 includes two cylinders; however, it may include a single cylinder. The single cylinder can keep a balance and easily decrease the size of the driving apparatus. The second support pin (swinging fulcrum) 26b can be supported by a cam follower or a slider shaped like a rectangular block as well as the ball bearing and optionally take the shape capable of overcoming a dead point by the swinging fulcrum. When the rectangular block-shaped slider is used, it may have a through hole into which the second support pin is rotatably inserted and may also be divided into two by a dividing surface crossing the through hole, on which concave and convex surfaces can be formed side by side in the axial direction of the second support pin.

Driving apparatuses according to other embodiments and modifications will be described below. In the following embodiments and modifications, the same element as that of the first embodiment is denoted by the same reference numeral and its detailed description will be omitted or simplified, and elements different from those of the first embodiment will be mainly described in detail.

Second Embodiment

Figure 9:
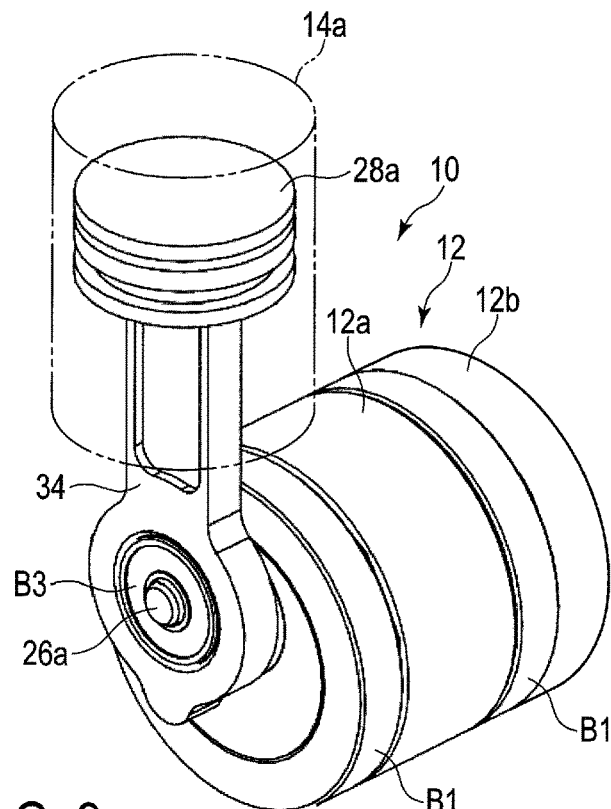
FIG. 9 is a perspective view showing a driving apparatus according to a second embodiment.
Figure 10:
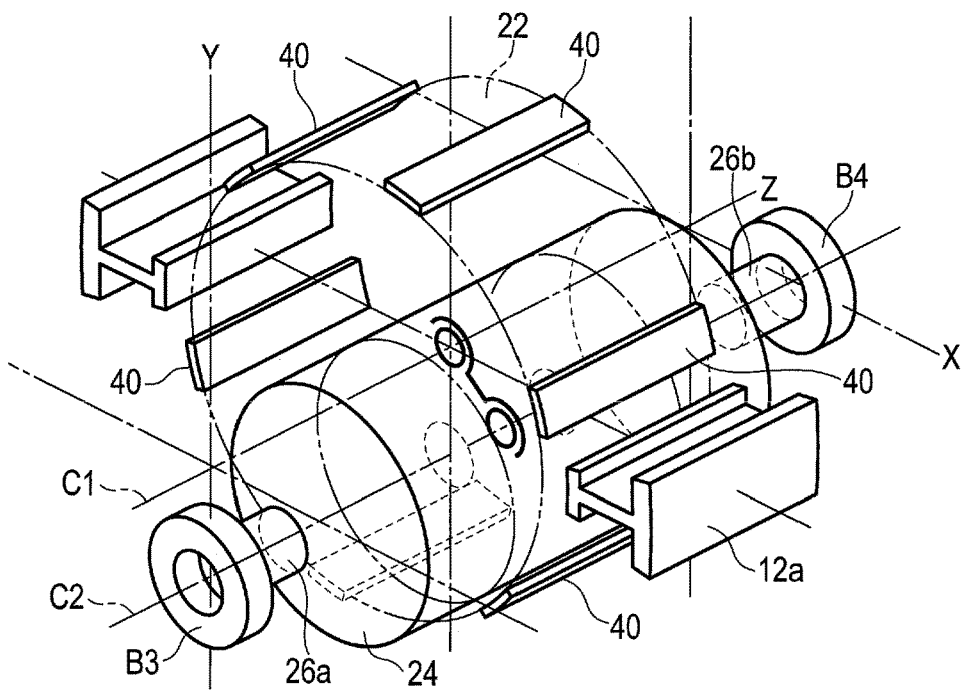
FIG. 10 is a conceptual diagram schematically showing a swinging linear motion mechanism of the driving apparatus according to the second embodiment.
Figure 11:
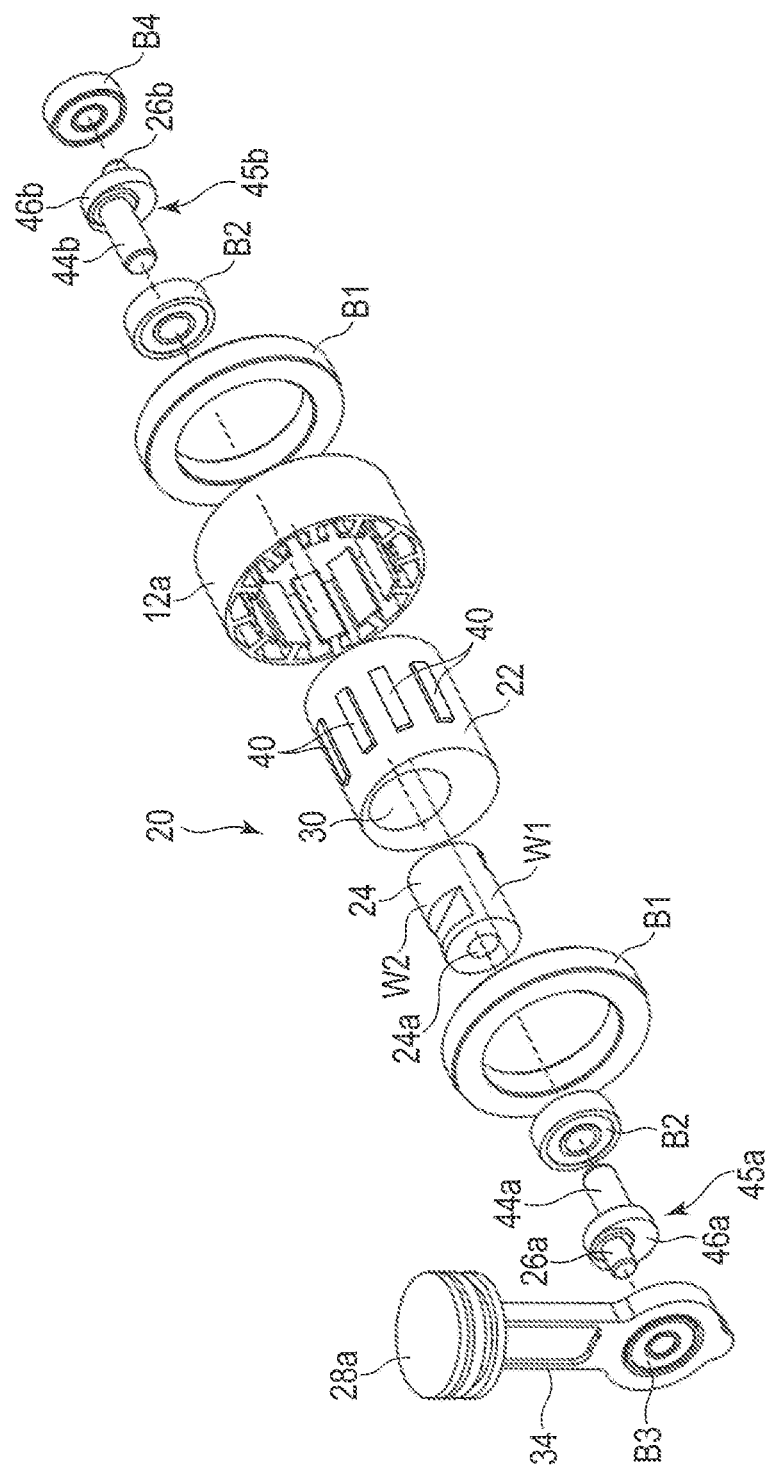
FIG. 11 is an exploded perspective view of the swinging linear motion mechanism of the driving apparatus according to the second embodiment.

FIG. 9 is a perspective view showing a driving apparatus according to a second embodiment. FIG. 10 is a perspective view schematically showing structural elements of the driving apparatus according to the second embodiment. FIG. 11 is an exploded perspective view of a swinging linear motion mechanism of the driving apparatus according to the second embodiment. FIG. 12 is a sectional view of the driving apparatus according to the second embodiment.

According to the present embodiment, a driving apparatus 10 is configured as a one-cylinder compressor with a built-in motor or a generator with an engine. As shown in FIGS. 9 to 12, a plurality of magnets 40 are fixed on the outer surface of an outer shaft 22. The magnets 40 extend parallel to the central axis C1 of the outer shaft 22 and are arranged at predetermined intervals in the circumferential direction of the outer shaft 22. As the magnets 40, a cylindrical magnet having a plurality of poles can be used. The main body 12a of a housing 12, which is a stator, is formed like a cylinder and disposed coaxially with the outer shaft 22 on the outside of the outer shaft 22. Either end portion of the outer shaft 22 in its axial direction is supported by a bearing B1 such that it can rotate relative to the housing 12. Thus, the outer shaft 22 and the magnets 40 constitute a rotor of the motor. An excitation coil 42 is provided on the inner surface side of the main body 12a and opposed to the magnets 40. The main body 12a and excitation coil 42 constitute a stator for applying a magnetic field to the magnets 40.

As described above, the outer shaft 22, magnets 40, main body 12a and excitation coil 42 constitute a motor. When the excitation coil 42 is energized to generate a driving magnetic field, the outer shaft 22 can be rotated.

A crankshaft will be described by dividing it into elements 26a, 44a, 45a and 46a. The inner shaft 24 is disposed in a through hole 30 of the outer shaft 22 and its axial-direction end portions are supported by a pair of bearings B2 such that they can rotate relative to the outer shaft 22. According to the present embodiment, a circular through hole 24a is formed in the inner shaft 24. The through hole 24a is provided coaxially with the central axis C2 of the inner shaft 24. A first crank pin 45a including the first support pin 26a is provided at one end of the inner shaft 24 in its axial direction. The first crank pin 45a includes a fitting pin 44a, a crank plate 46a orthogonal to the fitting pin 44a and a first support pin 26a protruding from the crank plate 46a, which are formed integrally as one unit. The first support pin 26a is provided parallel and eccentrically to the fitting pin 44a. The first crank pin 45a is fixed to the inner shaft 24 with the fitting pin 44a into the through hole 24a. The first support pin 26a extends in the Z-axis direction eccentrically to the inner shaft 24.

A second crank pin 45b including a second support pin 26b is provided at the other end of the inner shaft 24 in its axial direction. The second crank pin 45b includes a fitting pin 44b, a crank plate 46b orthogonal to the fitting pin 44b and a second support pin 26b protruding from the crank plate 46a, which are formed integrally as one unit. The second support pin 26b is provided parallel and eccentrically to the fitting pin 44b. The second crank pin 45b is fixed to the inner shaft 24 with the fitting pin 44b into the through hole 24a. The second support pin 26b extends in the Z-axis direction eccentrically to the inner shaft 24.

A piston rod 34 is coupled to the first support pin 26a through a bearing B3. The piston rod 34 is coupled to a first piston 28a, and the first piston 28a is guided by the first cylinder 14a such that it can reciprocate in the Y-axis direction. A bearing B4 is fitted to the second support pin 26b, and the bearing B4 is guided by a guide groove 12c such that it can move linearly along the X-axis direction. In the present embodiment, the inner shaft 24 includes counterweight portions W1 and W2. As in the first embodiment described above, the second support pin 26b can be supported by a cam follower or a slider shaped like a rectangular block as well as the ball bearing. The descriptions of the other configurations will be omitted because they are similar to those of the first embodiment.

According to the driving apparatus 10 according to the second embodiment configured as described above, the outer shaft 22 is rotated by the built-in motor to move the first piston 28a up and down in the Y-axis direction and compress and pressurize gas in the first cylinder 14a. It is thus possible to configure an integrated compressor by the driving apparatus 10. Furthermore, a cylinder head is provided with a combustion mechanism including a valve mechanism, a fuel supply means and an ignition means to make it possible to supply fuel into the first cylinder 14a and ignite the fuel and drive the first piston 28a in the Y-axis direction. The driving apparatus 10 can thus function as an engine. Alternatively, the inner and outer shafts 24 and 22 are rotated by the first piston 28a, with the result that the driving apparatus 10 can function as a generator that generates power from a motor.

According to the present embodiment, the built-in motor can decrease the size of the entire apparatus and also reduce power consumption. Furthermore, the crank plates 46a and 46b of the first and second crank pins 45a and 45b can function as a flywheel, with the result that both stable rotation and linear motion can be performed.

Third Embodiment

FIG. 13 is a perspective view showing a driving apparatus according to a third embodiment. FIG. 14 is an exploded perspective view of a swinging linear motion mechanism of the driving apparatus according to the third embodiment. FIG. 15 is a sectional view of the driving apparatus according to the second embodiment.

As shown in FIGS. 13 to 15, according to the present embodiment, the counterweights are not formed on the inner shaft 24 but provided independently on both ends of the inner shaft 24 in its axial direction. That is, the inner shaft 24 is formed like a cylinder having a coaxial through hole. The crank plate of the first crank pin 45a composes a counterweight W1. The crank plate of the second crank pin 45b composes a counterweight W2. The fitting pin 44a of the first crank pin 45a is fitted into the through hole 24a of the inner shaft 24 and thus the counterweight W1 is provided between the bearings B2 and B3 at one end of the inner shaft 24. Similarly, the fitting pin 44b of the second crank pin 45b is fitted into the through hole 24a of the inner shaft 24 and thus the counterweight W2 is provided between the bearings B2 and B4 at the other end of the inner shaft 24.

In the third embodiment, the other configurations of the driving apparatus 10 are the same as those of the driving apparatus according to the second embodiment described above.

Fourth Embodiment

FIG. 16 is a sectional view of a driving apparatus according to a third embodiment.

The attaching position of counterweights is not limited to the foregoing embodiments, but they can be set optionally by a mounting method, together with the motor capacity and the piston diameter. As shown in FIG. 16, according to the third embodiment, the driving apparatus 10 includes a single independent counterweight W1. The counterweight W1 is attached to the first support pin 26a and located outside a bearing B3. That is, the bearing b3 and piston rod 34 are placed between the crank plate 46a of the first crank pin 45a and the counterweight W1.

According to the above configuration, the single counterweight W1 has only to be placed on the piston side, which is effective, e.g., when a balance needs to be kept after the assembly. In the third embodiment, the other configuration of the driving apparatus 10 is the same as those of the driving apparatus according to the second embodiment described above.

Fifth Embodiment

FIG. 17 is a perspective view showing a driving apparatus according to a fifth embodiment. FIG. 18 is a partially cutaway perspective view of the driving apparatus according to the fifth embodiment.

According to the present embodiment, the driving apparatus 10 is configured as a cross four-cylinder driving apparatus. As shown in FIGS. 17 and 18, the driving apparatus 10 includes a third cylinder 14c and a fourth cylinder 14d which are attached to a one end portion of the housing 12 in addition to the first cylinder 14a and second cylinder 14b which are attached to the housing 12. The first and second cylinders 14a and 14b are provided at the one end portion of the housing 12 and also provided on both sides of the central axis C1 of the housing 12. The first and second cylinders 14a and 14b are arranged coaxially with each other and their central axis C3 extends along the Y-axis direction orthogonal to the central axis C1 of the housing 12. The cylinder heads 15a and 15b, which close the upper openings of the first and second cylinders 14a and 14b, are provided with an intake/exhaust mechanism, a fuel supply mechanism, an ignition means and the like, neither of which is shown.

The third and fourth cylinders 14c and 14d are provided at the other end portion of the housing 12 and also provided on both sides of the central axis C1 of the housing 12. The third and fourth cylinders 14c and 14d are arranged coaxially with each other and their central axis C4 extends along the X-axis direction orthogonal to the central axis C1 of the housing 12. That is, the central axis C4 of the cylinders 14c and 14d extends in a direction that is 90 degrees inverted from the central axis C3 of the first and second cylinders 14a and 14b. The cylinder heads 15c and 15d, which close the upper openings of the third and fourth cylinders 14c and 14d, are provided with an intake/exhaust mechanism, a fuel supply mechanism, an ignition means and the like, neither of which is shown.

The swinging linear motion mechanism 20 includes a first piston 28a provided in the first cylinder 14a and a second piston 28b provided in the second cylinder 14b. The first and second pistons 28a and 28b are coupled to each other by a piston rod 34 extending in the Y-axis direction. The central portion of the piston rod 34 is rotatably coupled to the first support pin 26a of the inner shaft 24 through the bearing B3. As the outer and inner shafts 22 and 24 rotate, the first and second pistons 28a and 28b are guided by the first and second cylinders 14a and 14b and move linearly in the Y-axis direction.

The swinging linear motion mechanism 20 includes a third piston 28c provided in the third cylinder 14c and a fourth piston 28d provided in the fourth cylinder 14d. The third and fourth pistons 28c and 28d are coupled to each other by a piston rod 34 extending in the X-axis direction. The central portion of the piston rod 34 is rotatably coupled to the second support pin 26b of the inner shaft 24 through the bearing B4. As the outer and inner shafts 22 and 24 rotate, the third and fourth pistons 28c and 28d are guided by the third and fourth cylinders 14c and 14d and move linearly in the X-axis direction.

The other configurations of the swinging linear motion mechanism 20 are the same as those of the swinging linear motion mechanism 20 in the first embodiment described above.

The driving apparatus 10 configured as described above can bring about the same advantages as those of the driving apparatus according to the first embodiment described above. Since the third and fourth pistons 28c and 28d that move linearly in the X-axis direction are provided, the inner and outer shafts 24 and 22 can be rotated through the second support pin 26b. Since, furthermore, the third and fourth pistons are provided to move linearly in the X-axis direction that is 90 degrees shifted from the Y-axis direction that is a motion direction of the first and second pistons 28a and 28b, a Stirling engine can be configured.

Sixth Embodiment

Figure 19:
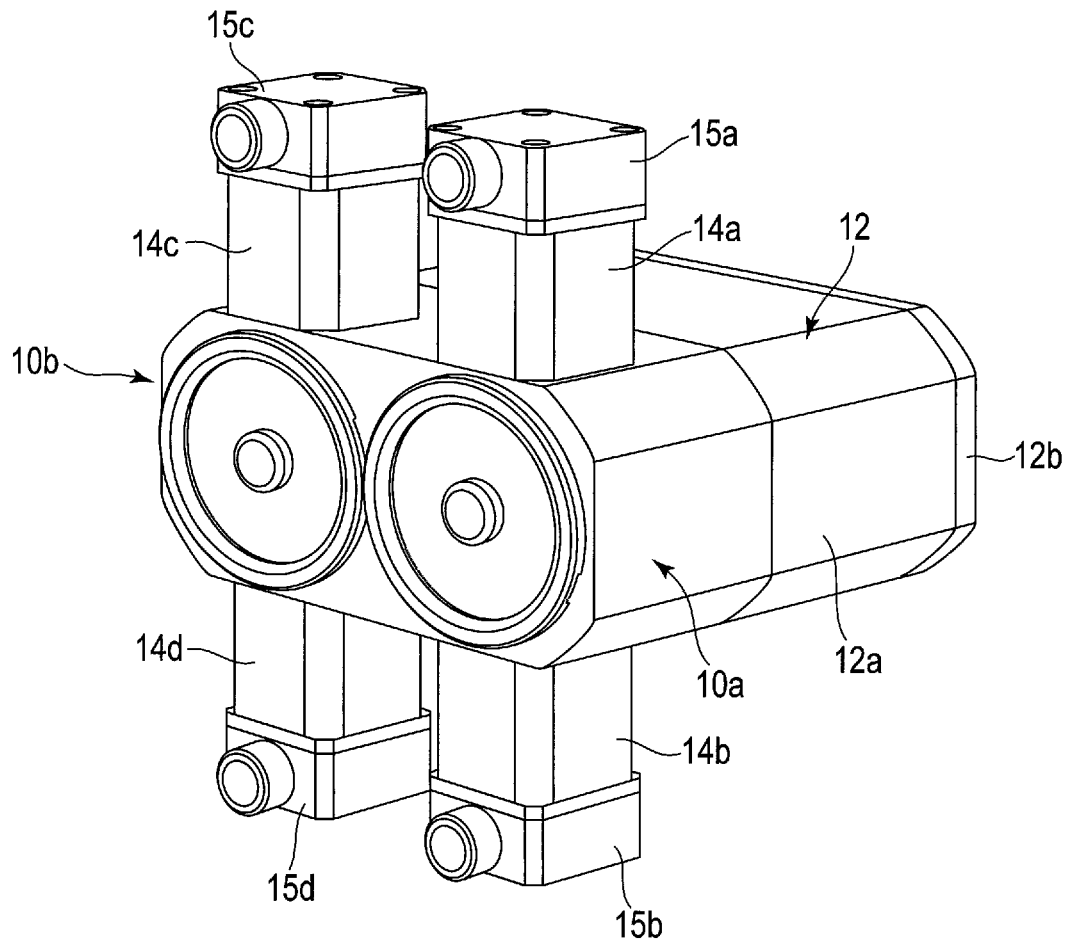
FIG. 19 is a perspective view showing a driving apparatus according to a sixth embodiment.

FIG. 19 is a perspective view showing a driving apparatus according to a sixth embodiment. FIG. 20 is a partially cutaway perspective view of the driving apparatus according to the sixth embodiment.

According to the present embodiment, the driving apparatus 10 is configured as a parallel four-cylinder driving apparatus including mirrors. As shown in FIGS. 19 and 20, the driving apparatus 10 includes a first driving device 10a and a second driving device 10b which have the same configuration as that of the driving apparatus according to the first embodiment described above. The first and second driving devices 10a and 10b are arranged symmetrically with regard to a central plane SC. The housing 12 includes a rectangular main body 12a common to the first and second driving devices 10a and 10b and a common end plate 12b that closes the opening of the main body 12a at one end.

The first driving device 10a includes a first cylinder 14a and a second cylinder 14b which are provided in the housing 12. The first and second cylinders 14a and 14b are provided coaxially with each other and along the Y-axis direction.

Similarly, the second driving device 10b includes a third cylinder 14c and a fourth cylinder 14b which are provided in the housing 12. The third and fourth cylinders 14c and 14d are provided coaxially with each other and along the Y-axis direction. That is, the third and fourth cylinders 14c and 14d are provided parallel to the first and second cylinders 14a and 14b.

The configuration of the swinging linear motion mechanism 20 in the housing 12 and the first and second cylinders 14a and 14b and that of the swinging linear motion mechanism 20 in the housing 12 and the third and fourth cylinders 14c and 14d are common to each other, and the common configuration is the same as that of the swinging linear motion mechanism 20 of the driving apparatus according to the first embodiment described above.

A ring gear 70 is fixed on the outer surface of the outer shaft 22 of the first driving device 10a coaxially with the outer shaft 22. Similarly, a ring gear 70 is fixed on the outer surface of the outer shaft 22 of the second driving device 10b coaxially with the outer shaft 22. These ring gears 70 are formed to have the same diameter and the same number of teeth and engaged with each other. Accordingly, the outer shaft 22 of the first driving device 10a and the outer shaft 22 of the second driving device 10b are coupled to each other via the ring gears 70. When one of the outer shafts 22 rotates, the other outer shaft 22 rotates in the opposite direction in synchronization with the former rotation. Accordingly, the outer shaft 22 of the first driving device 10a and the outer shaft 22 of the second driving device 10b rotate in opposite directions in synchronization with each other. The two ring gears 70 thus constitutes a coupling synchronization mechanism that rotates the two outer shafts 22 in opposite directions in synchronization with each other.

Since the first and second driving devices 10a and 10b are arranged and configured symmetrically with regard to the central plane SC, the swinging linear motion mechanism 20 including the first and second pistons 28a and 28b and the swinging linear motion mechanism 20 including the third and fourth pistons 28c and 28d can rotate and move linearly while maintaining conditions symmetrical with each other.

The driving apparatus 10 with the foregoing configuration can bring about the same advantage as that of the first embodiment described above. The two outer shafts 22 can rotate in opposite directions in synchronization with each other by driving the first to fourth pistons 28a to 28b. Alternatively, the first to fourth cylinders 24a to 28d can output the synchronized output by rotating at least one of the outer shafts 22 by the motor or the like. Furthermore, a basic vibration and an operation loss can be removed to achieve a quieter rotating body by mirror-arranging the first and second driving devices 10a and 10b. If the cylinders are shaped in the form of letter "U" in particular, high-pressure and low-pressure pistons are arranged side by side, which allows gas to move easily. The driving apparatus can thus be decreased in size.

Seventh Embodiment

Figure 21:
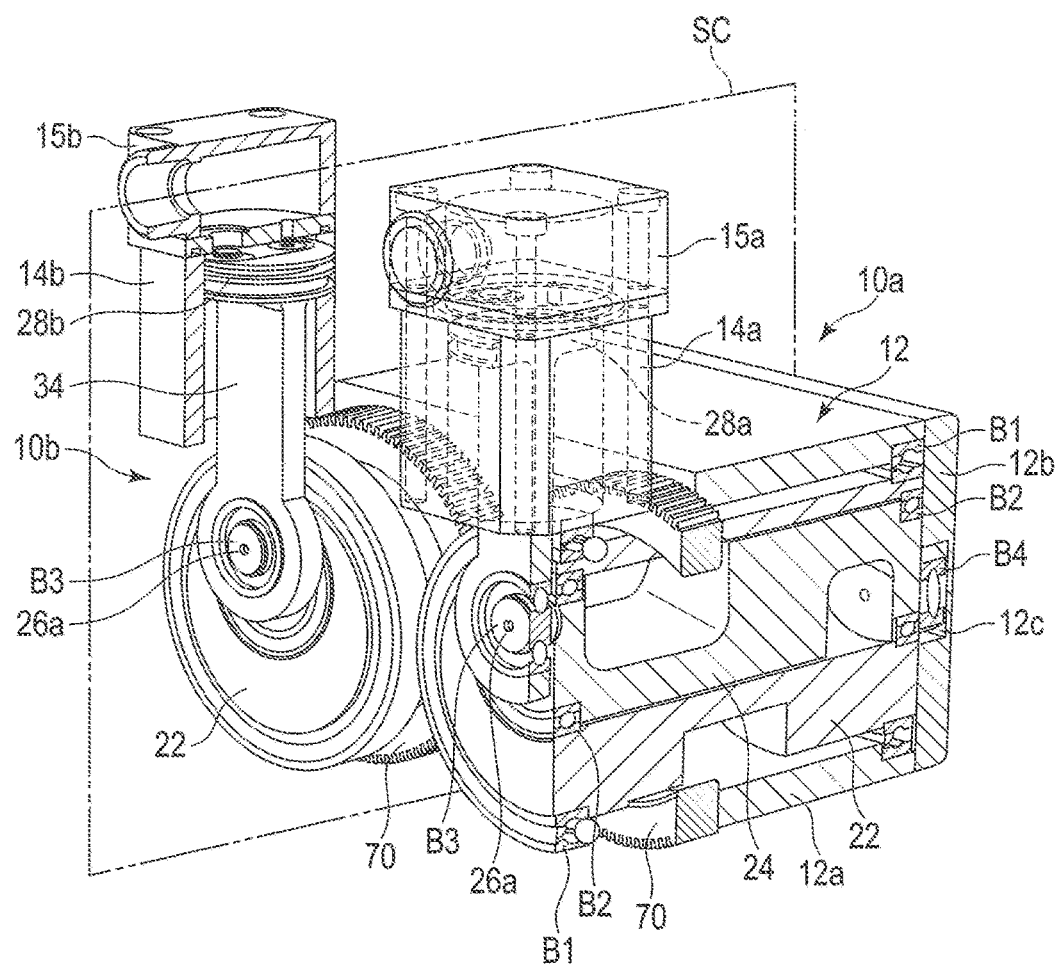
FIG. 21 is a partially cutaway perspective view showing a driving apparatus according to a seventh embodiment.

FIG. 21 is a partially cutaway perspective view showing a driving apparatus according to a seventh embodiment.

According to the present embodiment, the driving apparatus 10 is configured as a parallel two-cylinder driving apparatus including mirrors. The driving apparatus 10 is not limited to the foregoing four-cylinder driving apparatus but may be a two-cylinder driving apparatus. As shown in FIG. 21, the driving apparatus 10 includes a first driving device 10a having a first piston 28a disposed in the first cylinder 14a and the first cylinder 14a and a second driving device 10b having a second piston 28b disposed in the second cylinder 14b and the second cylinder 14b. The first and second driving devices 10a and 10b are arranged and configured symmetrically with each other with regard to the central plane SC. The housing 12 includes a rectangular main body 12a common to the first and second driving devices 10a and 10b and a common end plate 12b that closes the opening of the main body 12a at one end.

A ring gear 70 is fixed on the outer surface of the outer shaft 22 of the first driving device 10a coaxially with the outer shaft 22. Similarly, a ring gear 70 is fixed on the outer surface of the outer shaft 22 of the second driving device 10b coaxially with the outer shaft 22. These ring gears 70 are formed to have the same diameter and the same number of teeth and engaged with each other. Accordingly, the outer shaft 22 of the first driving device 10a and the outer shaft 22 of the second driving device 10b are coupled to each other via the ring gears 70. When one of the outer shafts 22 rotates, the other outer shaft 22 rotates in the opposite direction in synchronization with the former rotation. Accordingly, the outer shaft 22 of the first driving device 10a and the outer shaft 22 of the second driving device 10b rotate in opposite directions in synchronization with each other. Since, furthermore, the first and second driving devices 10a and 10b are arranged and configured symmetrically with regard to the central plane SC, the swinging linear motion mechanisms 20 including the first and second pistons 28a and 28b can rotate and move linearly while maintaining conditions symmetrical with each other.

In the seventh embodiment, the other configurations of the driving apparatus are the same as those of the sixth embodiment described above.

The foregoing two-cylinder driving apparatus 10 can also bring about the same advantages as those of the first and sixth embodiments described above. The two outer shafts 22 can rotate in opposite directions in synchronization with each other by driving the first and second pistons 28a to 28b. Alternatively, the first and second cylinders 24a and 28b can output the synchronized output by rotating at least one of the outer shafts 22 by the motor or the like.

While certain embodiments of the present invention have been described, they have been presented by way of examples and are not intended to limit the scope of the inventions. The novel embodiments can be embodied in other different forms, and various omissions, substitutions and changes can be made without departing from the spirit of the inventions. The embodiments and their modifications are included in the scope and spirit of the inventions and included in the inventions described in the claims and the scope of the equivalents.

What is claimed is:
1. A driving apparatus comprising:
a housing;
a first driving body supported in the housing to be rotatable around a first central axis;
an eccentric driving body provided in the first driving body to be rotatable around a second central axis parallel to the first central axis and to be revolvable around the first central axis;
a first pivot provided at one axial end of the eccentric driving body and eccentrically to the second central axis and extending parallel to the second central axis;
a second pivot provided at another axial end of the eccentric driving body and eccentrically to the second central axis and extending parallel to the second central axis;

a first moving body rotatably coupled to the first pivot and linearly movable along a third central axis orthogonal to the first central axis;

a first guide body which guides movement of the first moving body along the third central axis; and a second guide body which guides the second pivot such that the second pivot is linearly movable in a first direction orthogonal to the first central axis.

2. The apparatus of claim 1, wherein:

the first guide body includes a first cylinder provided coaxially with the third central axis; and the first moving body includes a first piston provided in the first cylinder and a piston rod coupled to the first piston, extending along the third central axis and rotatably coupled to the first pivot via a bearing.

3. The apparatus of claim 1, wherein:

the first guide body includes a first cylinder and a second cylinder which are provided at both sides of the first central axis coaxially with the third central axis; and the first moving body includes a first piston provided in the first cylinder, a second piston provided in the second cylinder, and a piston rod coupled to the first piston and the second piston and extending along the third central axis, the piston rod being rotatably coupled to the first pivot via a bearing.

4. The apparatus of claim 1, wherein the first driving body includes a column-shaped outer shaft, axial end portions of the outer shaft are rotatably supported to the housing by bearings, the outer shaft includes a through hole formed coaxially with the second central axis, the eccentric driving body includes a column-shaped inner shaft, and the inner shaft is disposed in the through hole of the outer shaft and rotatably supported to the outer shaft by bearings.

5. The apparatus of claim 4, wherein the first pivot and the second pivot are provided on the inner shaft in a position eccentric to the central axis of the inner shaft.

6. The apparatus of claim 1, further comprising a bearing, a cam follower or a slider, rotatably fitted to the second pivot, and wherein the second guide body includes a guide groove extending in the first direction, and the bearing, the cam follower or the slider is fitted into the guide groove movably in the first direction.

7. The apparatus of claim 1, further comprising a second moving body rotatably coupled to the second pivot and linearly movable in the first direction in accordance with moving of the second pivot.

8. The apparatus of claim 7, wherein:

the second guide body includes a third cylinder and a fourth cylinder provided at both sides of the first central axis coaxially with the first direction; and the second moving body includes a third piston provided in the third cylinder, a fourth piston provided in the fourth cylinder, and a piston rod coupled to the third piston and the fourth piston and extending along the first direction, the piston rod being rotatably coupled to the second pivot via a bearing.

9. The apparatus of claim 4, wherein the inner shaft includes a counterweight portion formed integrally therewith as one unit.

10. The apparatus of claim 1, further comprising a motor which rotates the first driving body.

11. The apparatus of claim 1, further comprising magnets provided on the first driving body and stators arranged around the first driving body and opposed to the magnets.

12. The apparatus of claim 1, further comprising a first counterweight provided at the first pivot and a second counterweight provided at the second pivot.

13. The apparatus of claim 2, further comprising a combustion mechanism which supplies a fuel into the first cylinder and ignites the fuel.

14. A driving apparatus comprising:

a first driving device; and a second driving device configured in a same manner as the first driving device and disposed symmetrically with the first driving device with regard to a central plane, each of the first driving device and the second driving device comprising:

a housing;

a first driving body supported in the housing so as to be rotatable around a first central axis;

an eccentric driving body provided in the first driving body to be rotatable around a second central axis parallel to the first central axis;

a first pivot provided at one end of the eccentric driving body in an axis direction and eccentrically to the second central axis and extending parallel to the second central axis;

a second pivot provided at another end of the eccentric driving body in the axis direction and eccentrically to the second central axis and extending parallel to the second central axis;

a first moving body rotatably coupled to the first pivot and linearly movable along a third central axis orthogonal to the first central axis;

a first guide body which guides movement of the first moving body along the third central axis; and a second guide body which guides the second pivot such that the second pivot is linearly movable in a first direction orthogonal to the first central axis, and wherein the first driving device and the second driving device comprise a coupling synchronization mechanism which rotates the first driving body of the first driving device and the first driving body of the second driving device in opposite directions in synchronization with each other.

* * * * *